United States Patent
Sambhwani et al.

(10) Patent No.: US 8,681,809 B2
(45) Date of Patent: Mar. 25, 2014

(54) DYNAMIC ENABLING AND DISABLING OF CLTD OPERATION VIA HS SCCH ORDERS

(75) Inventors: Sharad Deepak Sambhwani, San Diego, CA (US); Jilei Hou, Carlsbad, CA (US)

(73) Assignee: QUALCOMM Incorporated, San Diego, CA (US)

(*) Notice: Subject to any disclaimer, the term of this patent is extended or adjusted under 35 U.S.C. 154(b) by 193 days.

(21) Appl. No.: 13/285,185

(22) Filed: Oct. 31, 2011

(65) Prior Publication Data

US 2012/0188889 A1    Jul. 26, 2012

Related U.S. Application Data

(60) Provisional application No. 61/431,353, filed on Jan. 10, 2011, provisional application No. 61/442,653, filed on Feb. 14, 2011.

(51) Int. Cl.
    *H04L 12/28* (2006.01)

(52) U.S. Cl.
    USPC .......................................... 370/431

(58) Field of Classification Search
    USPC ................... 370/431–463, 310–349
    See application file for complete search history.

(56) References Cited

U.S. PATENT DOCUMENTS

| 2004/0067738 A1 | 4/2004 | Raghothaman |
| 2004/0147234 A1* | 7/2004 | Lin et al. ........................ 455/101 |
| 2005/0084029 A1 | 4/2005 | Lim |
| 2008/0151798 A1 | 6/2008 | Camp |
| 2011/0263218 A1* | 10/2011 | Ishii ................................ 455/138 |
| 2013/0194988 A1* | 8/2013 | KUBOTA et al. ............. 370/311 |

FOREIGN PATENT DOCUMENTS

| EP | 2 007 025 A2 | 12/2008 |
| GB | 2 414 365 A | 11/2005 |

OTHER PUBLICATIONS

3rd Generation Partnership Project; Technical Specification Group Radio Access Network; Universal Terrestrial Radio Access (UTRA) ; Uplink transmit diversity for High Speed Packet Access (HSPA) (Release 10) , 3GPP Standard; 3GPP TR 25.863, 3rd Generation Partnership Project (3GPP), Mobile Competence Centre ; 650, Route Des Lucioles ; F-06921 Sophia-Antipolis Cedex ; France, No. V1O.O.O, Jul. 5, 2010, pp. 1-212, XP050442001, retrieved on 2010-07-051 chapter 10.1 p. 209, line 7—line 18 p. 211, last paragraph.

Ericsson et al: "Some considerations on UL Tx Diversity for HSUPA", 3GPP Draft; R1-101304, 3rd Generation Partnership Project (3GPP), Mobile Competence Centre ; 650, Route Des Lucioles ; F-06921 Sophia-Antipolis Cedex ; France, vol. RAN WG1, no. San Francisco, USA; 20100222, Feb. 16, 2010, XP050418804, p. 2, lines 31-41 p. 1.

(Continued)

*Primary Examiner* — Fan Ng
(74) *Attorney, Agent, or Firm* — Darren M. Simon

(57) ABSTRACT

Apparatus and methods of wireless communication include configuring a closed loop transmit diversity (CLTD) operation between a User Equipment (UE) and an access node, detecting a condition of an uplink from the UE to the access node, and disabling CLTD operation by the UE based upon the condition. Optionally, the apparatus and methods may further include detecting that the condition of the uplink has ended, and in response enabling the CLTD operation.

29 Claims, 12 Drawing Sheets

(56) References Cited

OTHER PUBLICATIONS

Huawei: "Uplink Close Loop Transmit Diversity for HSPA", 3GPP Draft; R1-104750 Uplink CLTD for HSPA, 3rd Generation Partnership Project (3GPP), Mobile Competence Centre ; 650, Route Des Lucioles ; F-06921 Sophia-Anti Polis Cedex ; France, vol. RAN WG1, no. Madrid, Spain; 20100823, Aug. 19, 2010, XP050450199, [retrieved on Aug. 19, 2010] the whole document.

International Search Report and Written Opinion—PCT/US2012/020832—ISA/EPO—Apr. 5, 2012.

Qualcomm Incorporated: "On the benefits of Uplink Closed Loop Transmit Diversity", 3GPP Draft; R1-104737_0N the Benefits of UL CLTD, 3rd Generation Partnership Project (3GPP), Mobile Competence Centre ; 650, Route Des Lucioles ; F-06921 Sophia-Antipolis Cedex ; France, vol. RAN WGI, no. Madrid, Spain; 20100823, Aug. 17, 2010, XP050449978, [retrieved on Aug. 17, 2010].

* cited by examiner

DYNAMIC ENABLING AND DISABLING OF CLTD OPERATION VIA HS SCCH ORDERS

CLAIM OF PRIORITY UNDER 35 U.S.C. §119

The present Application for Patent claims priority to Provisional Application No. 61/442,653 entitled "Dynamic Enabling and Disabling of CLTD Operation via HS-SCCH Orders" filed Feb. 14, 2011, and Provisional Application No. 61/431,353 entitled "Dynamic Enabling and Disabling of CLTD Operation via HS-SCCH Orders" filed Jan. 10, 2011, both being assigned to the assignee hereof and both being hereby expressly incorporated by reference herein.

BACKGROUND

Aspects of the present disclosure relate generally to wireless communication systems, and more particularly, to closed-loop feedback for continuous relative evaluation for uplink transmit diversity.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

For a mobile user in the HSPA (High Speed Packet Access) cellular system, the user experience is often limited by transmit power of User Equipment (UE). For instance, a cell edge UE has to transmit at a low data rate, or possibly not establish a call, due to transmit power limitations. The technique of closed loop transmit diversity (CLTD) is useful to improve these situations. Assume multiple transmit antennas are utilized in the UE. The UE transmitter can apply a weighting vector to the transmit antennas such that the signals from these antennas are coherently combined at the base node (e.g. "Node B") receive antennas.

A reduction in the required UE transmit power due to beamforming gain from CLTD improves the link budget and the user experience. Furthermore, when the signals across different antennas experience independent fading, coherent signal combining results in a more stable composite channel with a smaller probability of deep fading. As such, beamforming can provide diversity gain. The motivation of considering the closed loop beamforming scheme is that, via the Node B processing and feedback, the UE transmitter can apply a beamforming phase to achieve the aforementioned gains (possibly at the expense of more complexity and more downlink feedback power). Since the UE forms the beam only toward the serving cell, the signals from the two UE transmit antennas are typically received at all other cells without constructive addition. Thus, from the network level point of view, the amount of interference caused by this UE at other Node B receivers is reduced. This interference reduction leads to network throughput improvement. However, there are scenarios where transmit diversity can result in detrimental performance.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, the present disclosure provides a method for wireless communication by configuring a closed loop transmit diversity (CLTD) operation between a User Equipment (UE) and an access node, detecting a condition of an uplink from the UE to the access node, and disabling the CLTD operation by the UE based upon the condition.

In another aspect, the present disclosure provides at least one processor for wireless communication. The processor includes a first module for configuring a CLTD operation between a UE and an access node. Further, the processor includes a second module for detecting a condition of an uplink from the UE to the access node, and a third module for disabling the CLTD operation by the UE based upon the condition.

In an additional aspect, the present disclosure provides a computer program product for wireless communication. A non-transitory computer-readable storage medium stores sets of code. A first set of code causes a computer to configure a CLTD operation between a UE and an access node. A second set of code causes the computer to detect a condition of an uplink from the UE to the access node. A third set of code causes the computer to disable the CLTD operation by the UE based upon the condition.

In a further aspect, the present disclosure provides an apparatus for wireless communication. The apparatus comprises means for configuring a CLTD operation between a UE and an access node. The apparatus further comprises means for detecting a condition of an uplink from the UE to the access node. Additionally, the apparatus comprises means for disabling the CLTD operation by the UE based upon the condition.

In yet another aspect, the present disclosure provides an apparatus for wireless communication. The apparatus includes a scheduler for configuring a CLTD operation between a UE and an access node. The apparatus further includes a receiver for detecting a condition of an uplink from the UE to the access node. Additionally, the apparatus includes a transmitter for disabling the CLTD operation by the UE based upon the condition.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

For a mobile user in an HSPA (High Speed Packet Access) cellular system, the user experience is often limited by transmit power of User Equipment (UE). For instance, a cell edge UE has to transmit at a low date rate, or possibly not establish a call, due to transmit power limitations. The technique of closed loop transmit diversity (CLTD) is useful to improve these situations. Assume multiple transmit antennas are utilized in the UE. The UE transmitter can apply a weighting vector to the transmit antennas such that the signals from these antennas are coherently combined at the base node (e.g., "Node B") receive antennas. However, there are scenarios where transmit diversity can result in detrimental performance. In such scenarios, the described apparatus and methods provide for disabling the CLTD operation for a brief period of time and then for enabling the CLTD operation when the scenario again becomes favorable for CLTD.

In an exemplary aspect, CLTD operation by itself is a dynamic procedure, wherein the Node B can signal Precoding Control Indication (PCI) bits to to the UE. In the present disclosure, a different form of dynamic control has a relatively slower update rate than the PCI bits. For this purpose, the HS-SCCH orders (as used in Continuous Packet Connectivity (CPC), Multi-Carrier High Speed Packet Access (MC-HSPA), etc.) are more appropriate.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
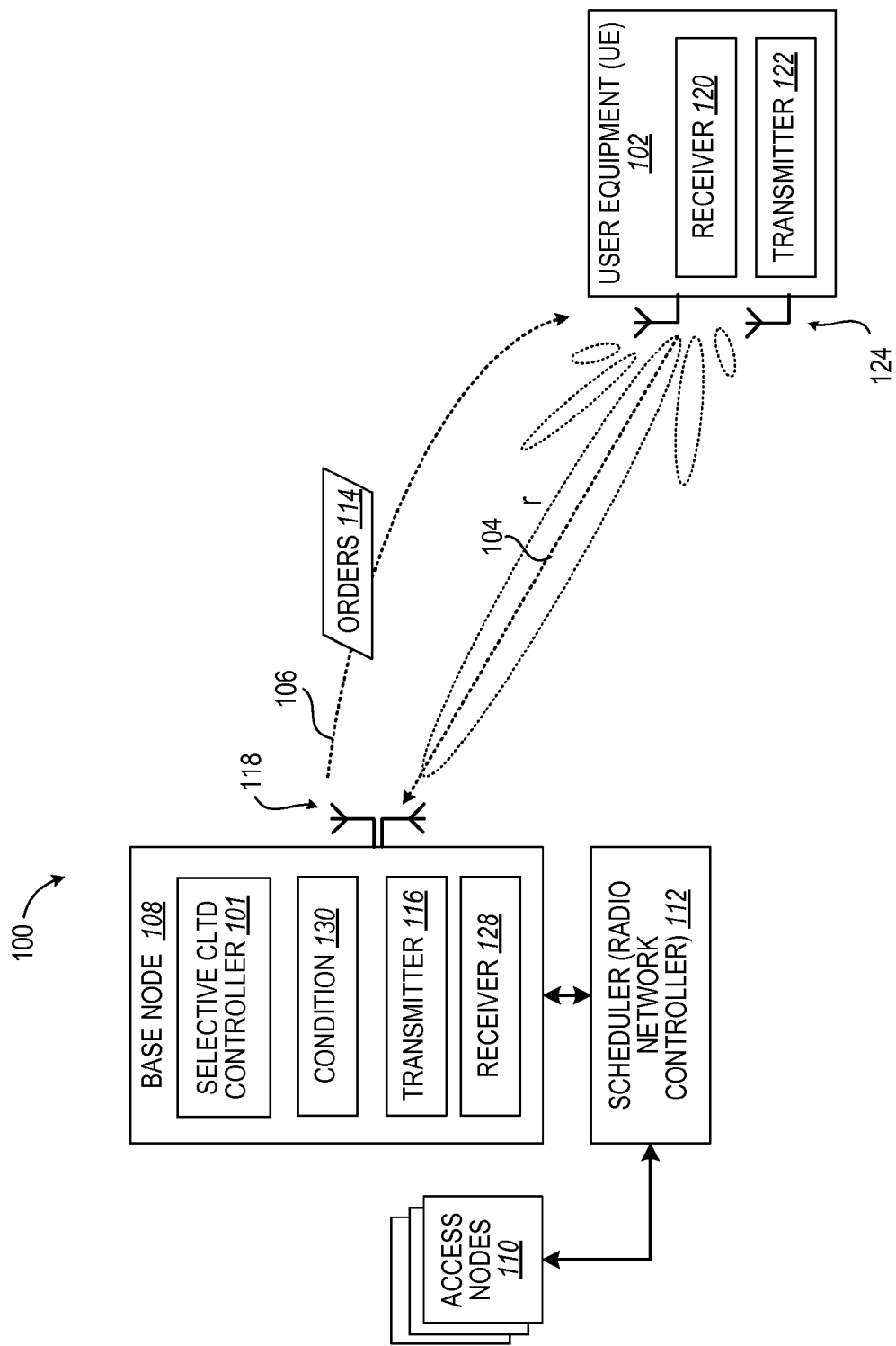
FIG. 1 is a schematic diagram of an aspect of a cellular communication system of a base station and mobile station performing Uplink Transmit Diversity (ULTD).

With reference to FIG. 1, in a wireless communication system 100, a selective Closed Loop Transmit Diversity (CLTD) controller 101 determines when to enable and to disable CLTD operation, according to aspects disclosed herein.

In particular, an access terminal, depicted as User Equipment (UE) 102, transmits on an uplink 104 according to a schedule provided to the UE 102 on a downlink 106 by an access node, depicted as base node ("Node B") 108. In an exemplary aspect, the Node B 108 is one of a plurality of access nodes 110 that are scheduled by a scheduler, depicted as a Radio Network Controller (RNC) 112. The RNC 112 configures CLTD operation in the UE 102 and Node B 108 as part of downlink signaling orders 114. The Node B 108 that currently serves the UE 102 uses a transmitter 116 to transmit the downlink signaling orders 114 via antenna(s) 118 on a High Speed Shared Control Channel (HS-SCCH) of the downlink 106. The downlink signaling orders 114 that enable or disable CLTD operation are received by a receiver 120, and the UE 102 uses a transmitter 122 to transmit via antennas 124 on the uplink 104, wherein the UE transmissions are received at antenna(s) 118 at a receiver 128 of the Node B 108.

A receiver, such as the receiver 128 of the Node B 108, detects scenarios or conditions 130 that are not favorable to CLTD operation. For instance, in one aspect, the receiver 128 of the Node B 108 estimates the speed or velocity of the UE 102 as the condition 130, and a determination is made as to whether the speed or velocity exceeds a limit or threshold for disabling CLTD operation.

Alternatively or in addition, the condition 130 can relate to a data error rate. For instance, in one aspect, the Node B 108 can determine that a number of packets received in error within a given time window exceeds a threshold. Thus, the RNC 112 can decide to disable the CLTD operation.

It should be appreciated that, in some aspects, the receiver 128 at the Node B 108 can indirectly detect the condition 130 based on what is received by the receiver 120 of the UE 102. For instance, due to an Inner Loop Power Control (ILPC) procedure at the UE 102 on the downlink 106, the UE 102 can require that the Node B 108 transmit power in excess of a threshold on a downlink control channel (e.g., HS-SCCH) that carries beamforming feedback weight information for CLTD operation. Based upon this condition 130 exceeding the threshold, the serving Node B can disable CLTD operation.

Once the condition 130 is detected as having been removed, e.g. by the receiver 128 or the Node B 108 and/or RNC 112 based on information from the receiver 128, the RNC 112 (or the receiver 128 or the Node B 108) can make the determination to enable CLTD operation and the Node B 108 can transmit downlink signaling orders 114 to the UE 102.

Figure 2:
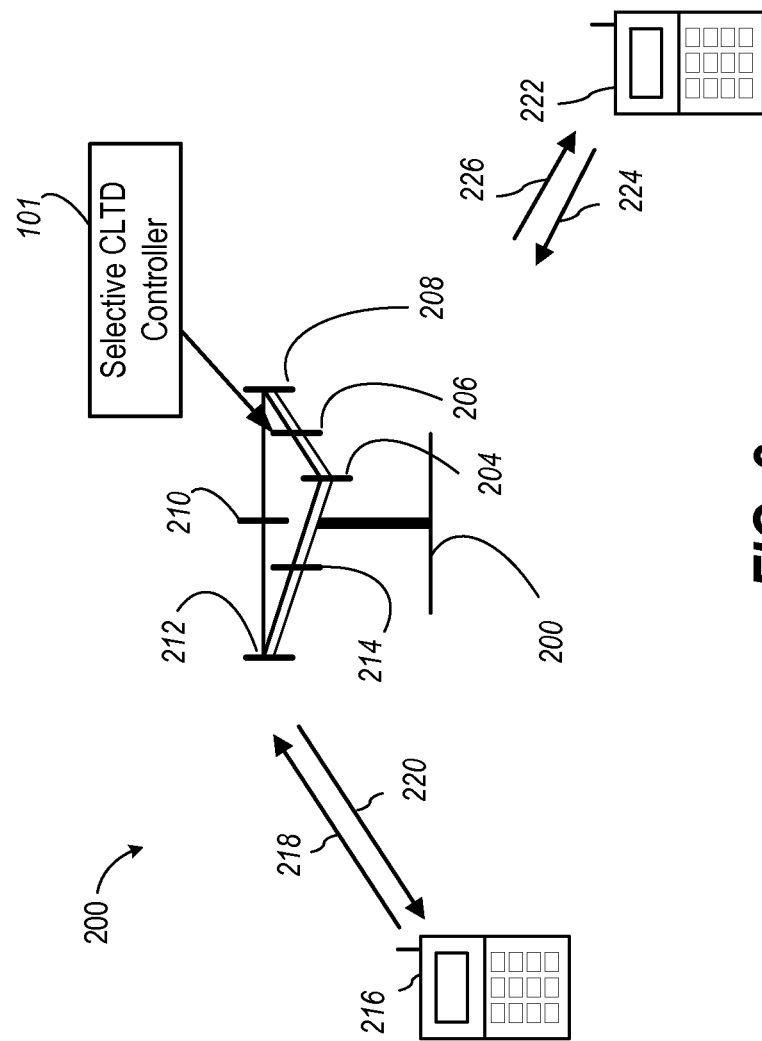
FIG. 2 is a diagram of an aspect of a user equipment (UE) and a base node for wireless communication.

In FIG. 2, a multiple access wireless communication system according to an example is illustrated. An access point (AP) or base station 200 includes multiple antenna groups, one including 204 and 206, another including 208 and 210, and still another including 212 and 214. In FIG. 2, only two antennas are shown for each antenna group, however, more or fewer antennas may be utilized for each antenna group. A mobile device or access terminal 216 (AT) is in communication with antennas 212 and 214, where antennas 212 and 214 transmit information to access terminal 216 over a downlink (DL) or forward link (FL) 220 and receive information from access terminal 216 over an uplink (UL) or reverse link 218. Access terminal 222 is in communication with antennas 206 and 208, where antennas 206 and 208 transmit information to access terminal 222 over DL or forward link 226 and receive information from access terminal 222 over UL or reverse link 224. In a Frequency Division Duplex (FDD) system, communication links 218, 220, 224 and 226 may use different frequency for communication. For example, forward link 220 may use a different frequency than that used by UL or reverse link 218.

Each group of antennas and/or the area in which they are designed to communicate is often referred to as a sector of the access point. In the example, antenna groups each are designed to communicate to access terminals in a sector of the areas covered by access point or base station 200.

In communication over forward links (or downlinks) 220 and 226, the transmitting antennas of base station or access point or base station 200 may utilize beamforming in order to improve the signal-to-noise ratio of forward links for the different access terminals 216 and 222. In addition, a base station or an access point using beamforming to transmit to access terminals scattered randomly through its coverage causes less interference to access terminals in neighboring cells than an access point transmitting through a single antenna to all its access terminals.

An access point may be a fixed or base station used for communicating with the terminals and may also be referred to as an access point, a Node B, or some other terminology. An access terminal may also be called an access terminal, user equipment (UE), a wireless communication device, terminal, access terminal or some other terminology. Additionally, the system in FIG. 2 may be a MIMO system employing multiple (NT) transmit antennas and multiple (NR) receive antennas for data transmission. A MIMO channel formed by the NT transmit and NR receive antennas may be decomposed into NS independent channels, which are also referred to as spatial channels. Each of the NS independent channels corresponds to a dimension. The MIMO system can provide improved performance (e.g., higher throughput and/or greater reliability) if the additional dimensionalities created by the multiple transmit and receive antennas are utilized.

It is noted that the system of FIG. 2 may employ continuous-valued measurement and feedback, such as CLTD, as an example. In a particular example, a mobile device (e.g., 216 or 222) may receive control feedback from an access point or base station 200 in continuous-valued control signaling. For example, the feedback can be used for closed-loop control of phase, power, etc. As discussed previously, performance degradation of closed-loop transmit diversity (CLTD), for example, results from necessary quantization due to limited availability of over-the-air (OTA) resources.

A selective CLTD controller 101 determines when to enable and to disable CLTD operation on an uplink, according with aspects disclosed herein.

Figure 3A:
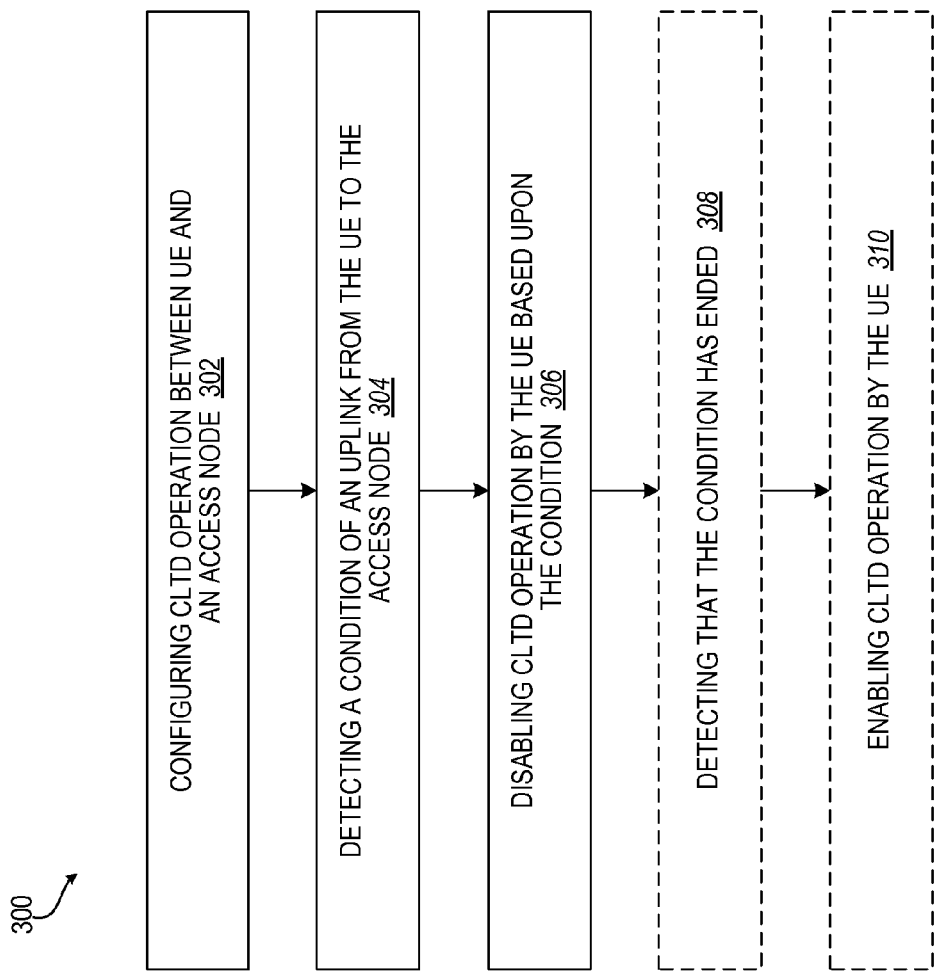
FIGS. 3A-3C are flow diagrams of aspects of methodologies for wireless communication by dynamically controlling ULTD.

In FIG. 3A, the present disclosure provides a methodology 300 for wireless communication. In an aspect, the methodology 300 may include configuring of a closed loop transmit diversity (CLTD) operation between a User Equipment (UE) and an access node (block 302). For instance, a scheduler or radio network controller may configure CLTD operation, including determining and transmitting beamforming feedback weight information to the UE.

In an exemplary aspect, the UE is configured for CLTD operation in a configuration comprising a Dedicated Physical Control Channel (DPCCH), Dedicated Physical Data Channel (DPDCH), High Speed Dedicated Physical Control Channel (HS DPCCH), Enhanced Dedicated Physical Control Channel (E DPCCH) and Enhanced Dedicated Physical Data Channel (E DPDCH) transmitted on a primary precoding vector via a first physical antenna, and comprising a Secondary Dedicated Physical Control Channel (S DPCCH) transmitted on a secondary precoding vector via a second physical antenna.

Further, the methodology 300 may include detecting a condition of an uplink from the UE to the access node (block 304). For instance, a receiver or other component of a Node B (or otherwise associated with the scheduler or RNC) can detect a velocity of the UE as being above a threshold. As another example, the receiver (or other network component) can determine a calculated transmit power for transmitting a downlink signaling order for the CLTD operation as being above a threshold. As an additional example, the receiver (or other network component) can determine a residual packet error rate at the access node as being above a threshold.

Also, the methodology 300 may include disabling CLTD operation by the UE based upon the condition (block 306). For instance, a transmitter at the Node B can transmit a downlink signaling order via HS-SCCH to the UE to cease CLTD operation.

Optionally, in an exemplary aspect, the methodology 300 may include detecting that the condition has ended (block 308). For example, in an aspect, the receiver detects that the condition of the uplink from the UE to the access node has ended. Also, optionally, the methodology 300 may include enabling the CLTD operation by the UE in response to the detection (block 310). For example, in an aspect, the transmitter may send an order to the UE to re-initiate CLTD operation.

Figure 3B:
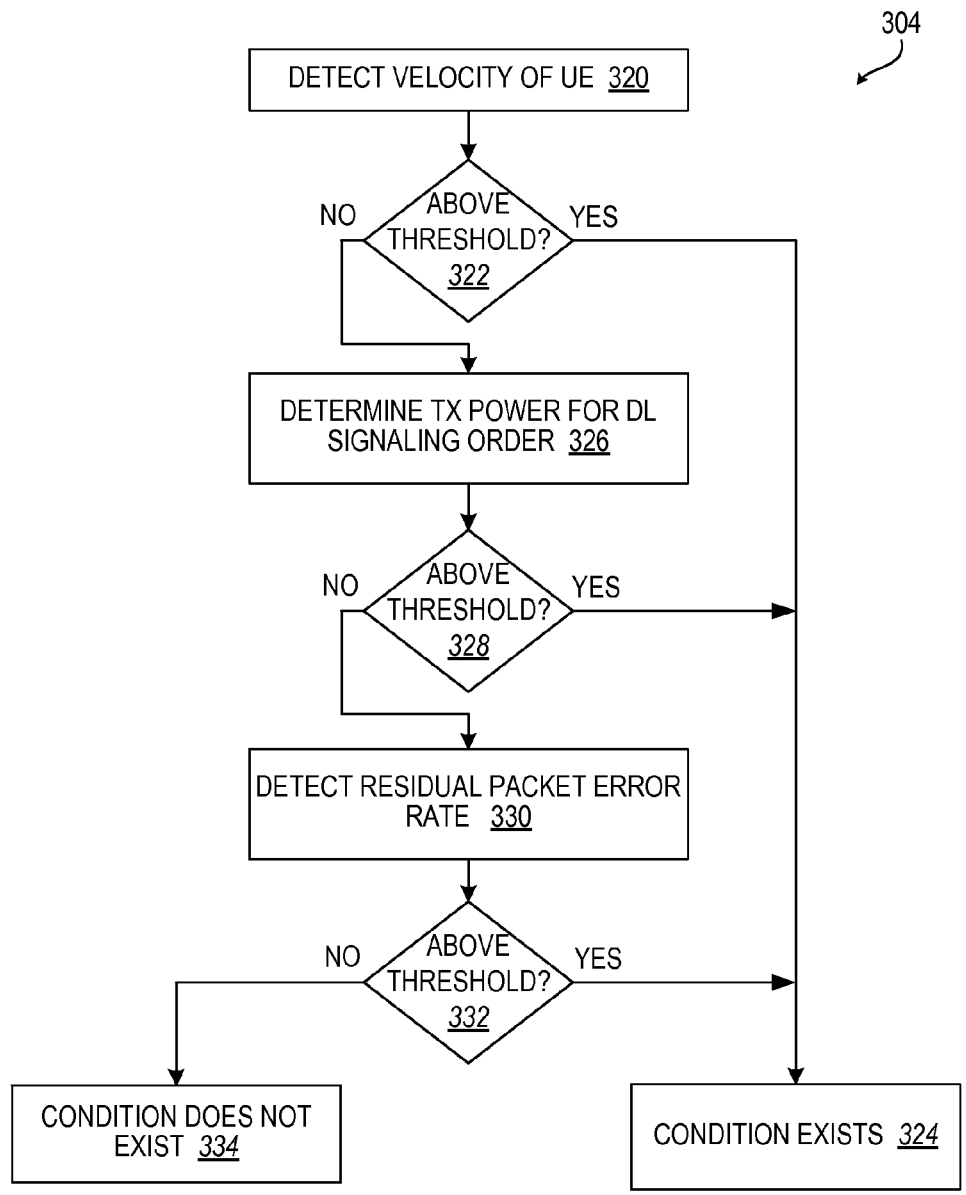

In FIG. 3B, an exemplary method 304 is depicted for detecting a condition of an uplink from the UE to the access node for the methodology 300 (FIG. 3A). While the technique of CLTD is useful in many scenarios, there are scenarios in which transmit diversity could result in detrimental performance. For example, a detrimental performance scenario may be when the serving Node B receiver estimates the speed (or velocity) of the UE to exceed a limit beyond which the loop cannot track the channel fast enough. As another example, a detrimental performance scenario may be when the inner loop power control (ILPC) procedure at the UE on the downlink results in the UE requiring excess power on the downlink control channel that carries the beamforming feedback weight information. As an additional example, a detrimental performance scenario may be when the serving Node B receiver receives many packets in error within a given time window. As a further example, a detrimental performance scenario may be when one of the antennas is temporarily attenuated by a large amount due to human effects and so it may be better to transmit the signal from only the stronger antenna. For instance, this condition can be detected at the Node B by measuring the difference between the long-term Signal-to-Noise Ratios (SNRs) of the channel estimates of the raw channel. In such scenarios, it may be useful to dynamically control the ULTD operation.

With continued reference to FIG. 3B, for clarity a sequence of determinations are depicted, any of which can indicate that a condition exists for disabling ULTD. However, implementations consistent with the present innovation can incorporate subsets, combinations, or additional determinations similar to those described.

For example, a network component, such as the scheduler and/or receiver, detects a velocity of the UE (block 320). A network component, such as the scheduler and/or receiver, makes as determination as to whether the velocity is above a threshold (block 322). In response, a network component, such as the scheduler and/or receiver, determines existence of the condition (e.g., a detrimental performance scenario) of the uplink from the UE to the access node based at least in part upon the determination (block 324).

Alternatively or in addition, if the detected velocity is determined not to be above the threshold (block 322), then a network component, such as the scheduler and/or transmitter, determines a transmit power for transmitting downlink signaling order for the CLTD operation (block 326). A network component, such as the scheduler and/or transmitter, then makes a determination as to whether the transmit power is above a threshold (block 328). If so, then a network component, such as the scheduler and/or transmitter, determines existence of the condition (e.g., a detrimental performance scenario) of the uplink to exist (block 324).

Alternatively or in addition, a network component, such as the scheduler and/or receiver, detects residual packet error rate at the access node (block 330). A network component, such as the scheduler and/or receiver, makes a determination as to whether the detected residual packet error rate is above a threshold (block 332). If so, a network component, such as the scheduler and/or receiver, determines existence of the condition (e.g., a detrimental performance scenario) of the uplink (block 324). If not, a network component, such as the scheduler and/or receiver, determines the condition does not exist (block 334).

Figure 3C:
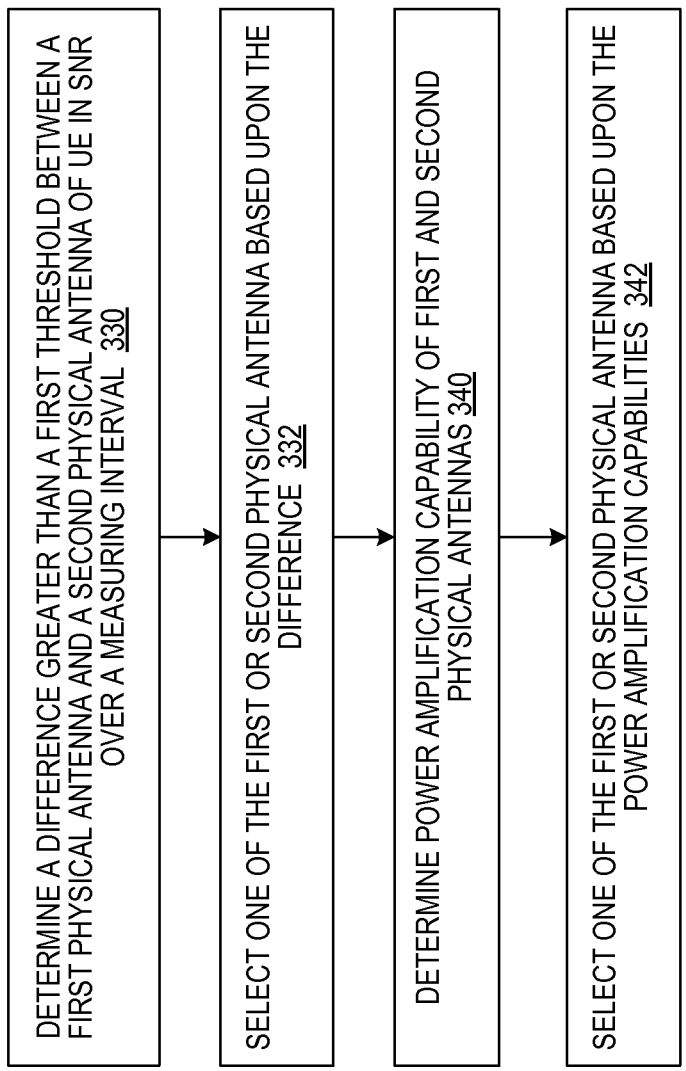

In FIG. 3C, an exemplary method 306 is depicted for disabling CLTD operation by the UE based upon the condition for the methodology 300 (FIG. 3A). In particular, the method 306 can selectively configure the UE rather than merely transmitting a DPCCH, the DPDCH, the HS DPCCH, the E DPCCH, and E DPDCH on the first physical antenna as a default and not using the second physical antenna.

For example, a network component, such as the scheduler and/or the receiver, can determine a difference greater than a first threshold between a first physical antenna and a second physical antenna in signal-to-noise ratio over a measuring interval (block 330). Further, a network component, such as the scheduler and/or transmitter, can select for and instruct the UE to transmit in a non-CLTD operation on one of the first physical antenna and the second physical antenna based upon the determining of the difference (block 332).

Alternatively or in addition, a network component, such as the scheduler and/or the receiver, can determine a first power amplification capability of the UE for transmitting on the first physical antenna and a second power amplification capability of the UE for transmitting on the second physical antenna (block 340). A network component, such as the scheduler and/or the transmitter, can select one of the first physical antenna and second physical antenna to transmit the DPCCH, the DPDCH, the HS DPCCH, the E DPCCH, and E DPDCH based upon the determining of the first and second power amplification capability (block 342).

Figure 4A:
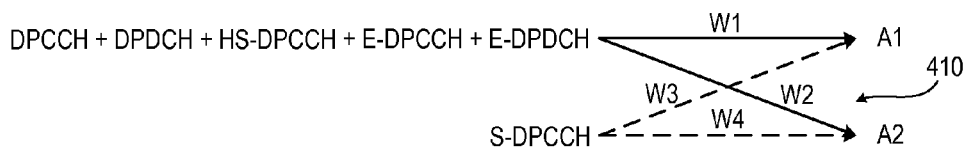
FIGS. 4A-4E are diagrams of aspects of UE configurations for dynamically controlling ULTD.

FIGS. 4A-4E depict different UE configurations to support the method 300 (FIG. 3A). In FIG. 4A, as depicted at 410, the UE is operating normally in CLTD mode with the DPCCH, DPDCH, HS-DPCCH, E-DPCCH and E-DPDCH transmitted on the primary precoding vector and the S-DPCCH transmitted on the secondary precoding vector. This normal CLTD mode is referred hereafter as ULTD configuration one (1): DPCCH/HS-DPCCH/E-DCH on primary precoding vector and S-DPCCH on secondary precoding vector.

Figure 4B:
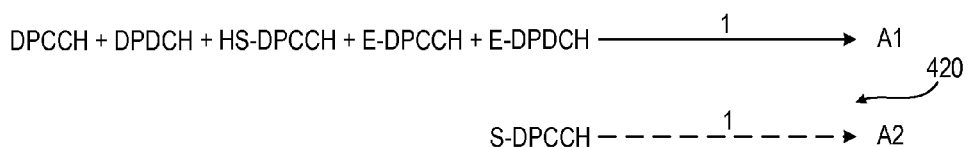

FIG. 4B corresponds to a use case where beamforming has a detrimental effect, such as the user is at high velocity or physical antenna 2 (A2) is experiencing a high attenuation relative to physical antenna 1 (A1). In this case, it may be beneficial to transmit the DPCCH, DPDCH, HS-DPCCH, E-DPCCH and E-DPDCH on the physical antenna 1 and S-DPCCH on physical antenna 2. The reason for sending S-DPCCH on antenna 2 (A2) is to allow for channel sounding so that the Node B could detect when to restart the beamforming procedure, such as by reconfiguring the UE to ULTD configuration one (1). This mode is hereafter referred to as ULTD configuration two (2): DPCCH/HS-DPCCH/E-DCH on physical antenna 1 (A1) and S-DPCCH on physical antenna 2 (A2).

Figure 4C:
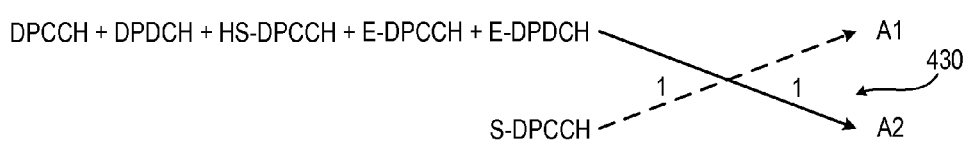

The use case in FIG. 4C is identical to the use case in FIG. 4B, except that the roles of physical antenna 1 and 2 are reversed. This mode is hereafter referred to as ULTD configuration three (3): DPCCH/HS-DPCCH/E-DCH on physical antenna 2 (A2) and S-DPCCH on physical antenna 1 (A1).

Figure 4D:
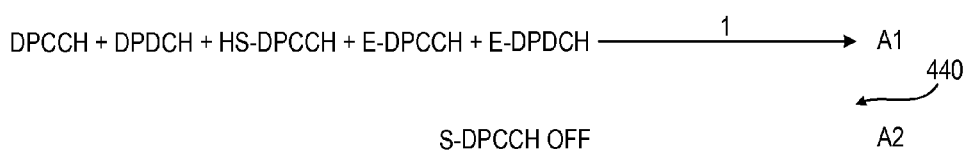

FIG. 4D corresponds to the case when the UE is operating in legacy mode wherein ULTD is merely de-activated or disabled. This mode is hereafter referred to as ULTD configuration four (4): DPCCH/HS-DPCCH/E-DCH on physical antenna 1 (A1) and S-DPCCH is disabled.

Figure 4E:
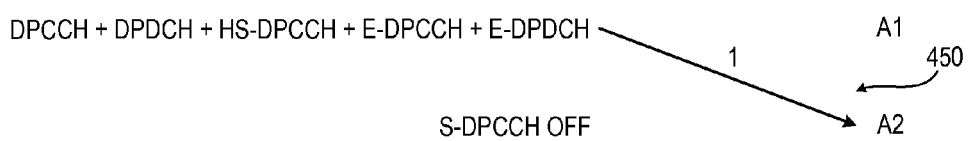

FIG. 4E also corresponds to falling back to a non-ULTD mode, which can be a state wherein ULTD is de-activated or disabled, except that instead the UE transmits on physical antenna 2 (A2). This configuration would have some advantage if the UE were to experience a long term imbalance between physical antenna 1 and 2. This mode is hereafter referred to as ULTD configuration five (5): DPCCH/HS-DPCCH/E-DCH on physical antenna 2 (A2) and S-DPCCH is disabled.

TABLE 1 summarizes the 5 different ULTD configurations discussed above. In an aspect, configurations two (2), three (3) and five (5) may be supported via HS-SCCH orders.

TABLE 1

| ULTD Config- uration | Uplink Channels | | | | |
| --- | --- | --- | --- | --- | --- |
| | DPCCH | HS-DPCCH | E-DPCCH | E-DPDCH | S-DPCCH |
| 1 | Primary Precoding Vector | | | | Secondary Precoding Vector |
| 2 | Physical Antenna 1 | | | | Physical Antenna 2 |
| 3 | Physical Antenna 2 | | | | Physical Antenna 1 |
| 4 | Physical Antenna 1 | | | | De-activate |
| 5 | Physical Antenna 2 | | | | De-activate |

The discussion in the previous section on the five (5) different ULTD configurations may allow for the possibility that the UE is operating on two full-power PAs (Power Amplifiers).

In general, three different UE implementations (referred to as UEn, where n represents the implementation number) may exist:

(1) UE1: Two half power PAs;
(2) UE2: One full power PA on physical antenna 1 (A1) and one half-power PA on physical antenna 2 (A2); and
(3) UE3: Two full-power PAs.

It should be appreciated with the benefit of the present disclosure that UE3 should be able to support the five (5) different ULTD configurations based on PA maximum power basis. However, for UE1 and UE2, depending on the capability to re-configure the PA from half-power to full-power and vice versa, it may or may not be possible to support the ULTD configurations for these UE types discussed above. In one aspect, a UE can signal its PA capability on each antenna to the UTRAN.

By virtue of the foregoing, the present innovation thus provides for Node B-based dynamic control of the ULTD operation. In an exemplary aspect, the rate of dynamic control need not be as fast as the update rate at which PCI bits are fed back to the Node B, thus enabling HS-SCCH orders to be a better choice. Furthermore five (5) different ULTD configurations were discussed and depending on the PA capability in the UE, it may or may not be possible for a UE to support these configurations. In one exemplary implementation, dynamic control of ULTD operation is via HS-SCCH orders. As a minimum, this aspect allows the HS-SCCH order to reconfigure UE to either ULTD configuration one (1) (beamforming is activated) or ULTD configuration four (4) (beamforming is de-activated and UE transmits on primary antenna). In another exemplary implementation, UE1 (two half power PAs) and UE2 (One full power PA and one half power PA) can support ULTD configurations two (2), three (3) and five (5). In a particular aspect, signaling of UE PA capability to the UTRAN can assist in selecting the appropriate configuration.

Figure 5:
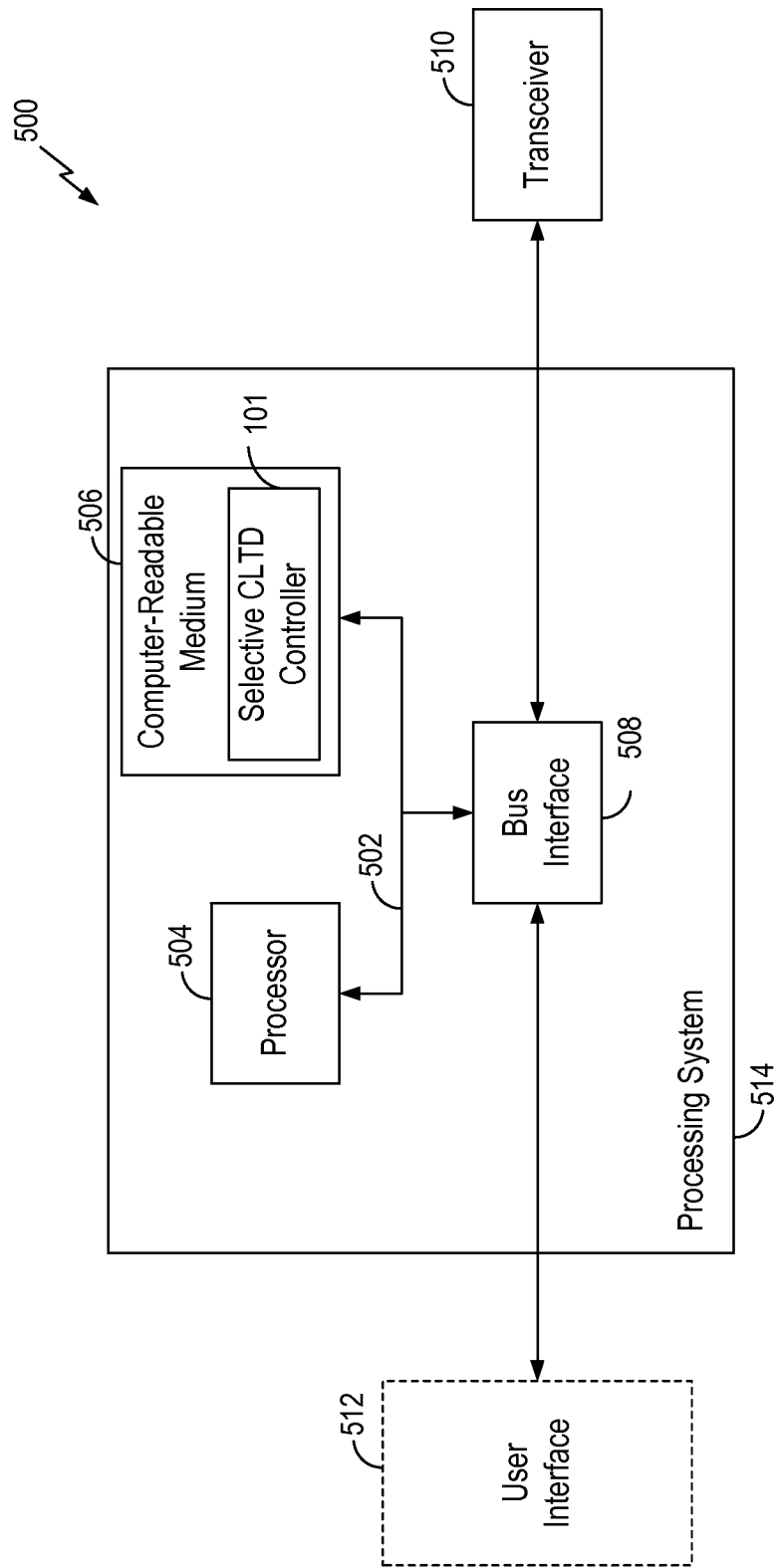
FIG. 5 is a diagram illustrating an example of a hardware implementation for an aspect of an apparatus employing a processing system for controlling ULTD.

FIG. 5 is a conceptual diagram illustrating an example of a hardware implementation for an apparatus 500 employing a processing system 514. In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits including one or more processors, represented generally by the processor 504, and computer-readable media, represented generally by the computer-readable medium 506. The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described infra for any particular apparatus. The computer-readable medium 506 may also be used for storing data that is manipulated by the processor 504 when executing software.

A selective CLTD controller 101 can act as a client agent or make determination on behalf of the apparatus 500 for determining when to enable and to disable CLTD operation on an uplink, according with aspects disclosed herein.

Figure 6:
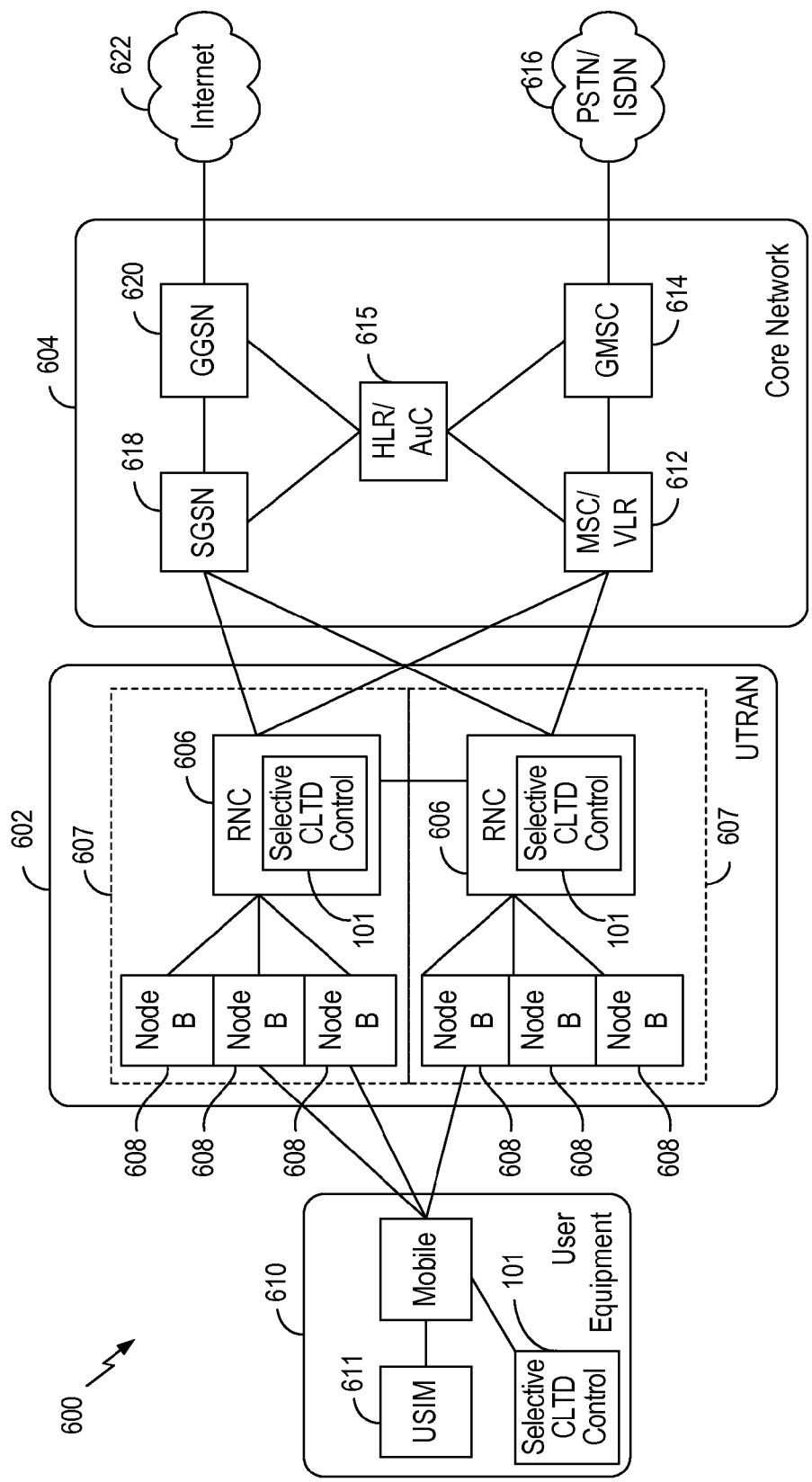
FIG. 6 is a block diagram conceptually illustrating an example of an aspect of a telecommunications system including the described aspects for controlling ULTD.

The various concepts presented throughout this disclosure may be implemented across a broad variety of telecommunication systems, network architectures, and communication standards. By way of example and without limitation, the aspects of the present disclosure illustrated in FIG. 6 are presented with reference to a UMTS system 600 employing a W-CDMA air interface. A UMTS network includes three interacting domains: a Core Network (CN) 604, a UMTS Terrestrial Radio Access Network (UTRAN) 602, and User Equipment (UE) 610. In this example, the UTRAN 602 provides various wireless services including telephony, video, data, messaging, broadcasts, and/or other services. The UTRAN 602 may include a plurality of Radio Network Subsystems (RNSs) such as an RNS 607, each controlled by a respective Radio Network Controller (RNC) such as an RNC 606. Here, the UTRAN 602 may include any number of RNCs 606 and RNSs 607 in addition to the RNCs 606 and RNSs 607 illustrated herein. The RNC 606 is an apparatus responsible for, among other things, assigning, reconfiguring and releasing radio resources within the RNS 607. The RNC 606 may be interconnected to other RNCs (not shown) in the UTRAN 602 through various types of interfaces such as a direct physical connection, a virtual network, or the like, using any suitable transport network.

Communication between a UE 610 and a Node B 608 may be considered as including a physical (PHY) layer and a medium access control (MAC) layer. Further, communication between a UE 610 and an RNC 606 by way of a respective Node B 608 may be considered as including a radio resource control (RRC) layer. In the instant specification, the PHY layer may be considered layer 1; the MAC layer may be considered layer 2; and the RRC layer may be considered layer 3. Information herein utilizes terminology introduced in Radio Resource Control (RRC) Protocol Specification, 3GPP TS 25.331 v9.1.0, incorporated herein by reference.

The geographic region covered by the SRNS 607 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 608 are shown in each SRNS 607; however, the SRNSs 607 may include any number of wireless Node Bs. The Node Bs 608 provide wireless access points to a core network (CN) 604 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 610 may further include a universal subscriber identity module (USIM) 611, which contains a user's subscription information to a network. For illustrative purposes, one UE 610 is shown in communication with a number of the Node Bs 608. The downlink (DL), also called the forward link, refers to the communication link from a Node B 608 to a UE 610, and the uplink (UL), also called the reverse link, refers to the communication link from a UE 610 to a Node B 608.

The core network 604 interfaces with one or more access networks, such as the UTRAN 602. As shown, the core network 604 is a GSM core network. However, as those skilled in the art will recognize, the various concepts presented throughout this disclosure may be implemented in a RAN, or other suitable access network, to provide UEs with access to types of core networks other than GSM networks.

The core network 604 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 604 supports circuit-switched services with a MSC 612 and a GMSC 614. In some applications, the GMSC 614 may be referred to as a media gateway (MGW). One or more RNCs, such as the RNC 606, may be connected to the MSC 612. The MSC 612 is an apparatus that controls call setup, call routing, and UE mobility functions. The MSC 612 also includes a visitor location register (VLR) that contains subscriber-related information for the duration that a UE is in the coverage area of the MSC 612. The GMSC 614 provides a gateway through the MSC 612 for the UE to access a circuit-switched network 616. The GMSC 614 includes a home location register (HLR) 615 containing subscriber data, such as the data reflecting the details of the services to which a particular user has subscribed. The HLR is also associated with an authentication center (AuC) that contains subscriber-specific authentication data. When a call is received for a particular UE, the GMSC 614 queries the HLR 615 to determine the UE's location and forwards the call to the particular MSC serving that location.

The core network 604 also supports packet-data services with a serving GPRS support node (SGSN) 618 and a gateway GPRS support node (GGSN) 620. GPRS, which stands for General Packet Radio Service, is designed to provide packet-data services at speeds higher than those available with standard circuit-switched data services. The GGSN 620 provides a connection for the UTRAN 602 to a packet-based network 622. The packet-based network 622 may be the Internet, a private data network, or some other suitable packet-based network. The primary function of the GGSN 620 is to provide the UEs 610 with packet-based network connectivity. Data packets may be transferred between the GGSN 620 and the UEs 610 through the SGSN 618, which performs primarily the same functions in the packet-based domain as the MSC 612 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 608 and a UE 610. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

A selective CLTD controller 101, depicted as distributed across RNCs 606 and UE 610, determines when to enable and to disable CLTD operation on an uplink, according with aspects disclosed herein.

Figure 7:
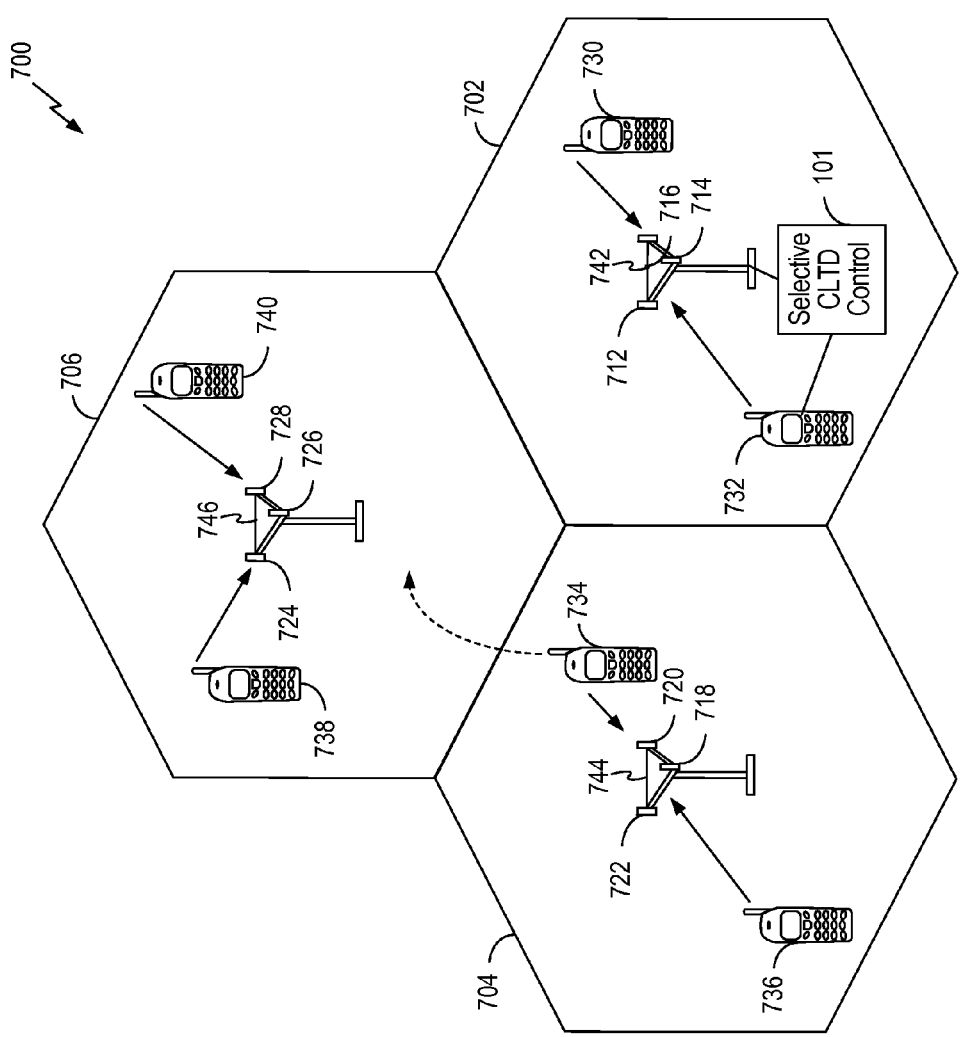
FIG. 7 is a conceptual diagram illustrating an example of an access network including the described aspects for controlling ULTD.

Referring to FIG. 7, an access network 700 in a UTRAN architecture is illustrated. The multiple access wireless communication system includes multiple cellular regions (cells), including cells 702, 704, and 706, each of which may include one or more sectors. The multiple sectors can be formed by groups of antennas with each antenna responsible for communication with UEs in a portion of the cell. For example, in cell 702, antenna groups 712, 714, and 716 may each correspond to a different sector. In cell 704, antenna groups 718, 720, and 722 each correspond to a different sector. In cell 706, antenna groups 724, 726, and 728 each correspond to a different sector. The cells 702, 704 and 706 may include several wireless communication devices, e.g., User Equipment or UEs, which may be in communication with one or more sectors of each cell 702, 704 or 706. For example, UEs 730 and 732 may be in communication with Node B 742, UEs 734 and 736 may be in communication with Node B 744, and UEs 738 and 740 can be in communication with Node B 746. Here, each Node B 742, 744, 746 is configured to provide an access point to a core network 604 (see FIG. 6) for all the UEs 730, 732, 734, 736, 738, 740 in the respective cells 702, 704, and 706.

As the UE 734 moves from the illustrated location in cell 704 into cell 706, a serving cell change (SCC) or handover may occur in which communication with the UE 734 transitions from the cell 704, which may be referred to as the source cell, to cell 706, which may be referred to as the target cell. Management of the handover procedure may take place at the UE 734, at the Node Bs corresponding to the respective cells, at a radio network controller 606 (see FIG. 6), or at another suitable node in the wireless network. For example, during a call with the source cell 704, or at any other time, the UE 734 may monitor various parameters of the source cell 704 as well as various parameters of neighboring cells such as cells 706 and 702. Further, depending on the quality of these parameters, the UE 734 may maintain communication with one or more of the neighboring cells. During this time, the UE 734 may maintain an Active Set, that is, a list of cells that the UE 734 is simultaneously connected to (i.e., the UTRA cells that are currently assigning a downlink dedicated physical channel DPCH or fractional downlink dedicated physical channel F-DPCH to the UE 734 may constitute the Active Set).

The modulation and multiple access scheme employed by the access network 700 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

A selective CLTD controller 101 determines when to enable and to disable CLTD operation on an uplink, according with aspects disclosed herein.

Figure 8:
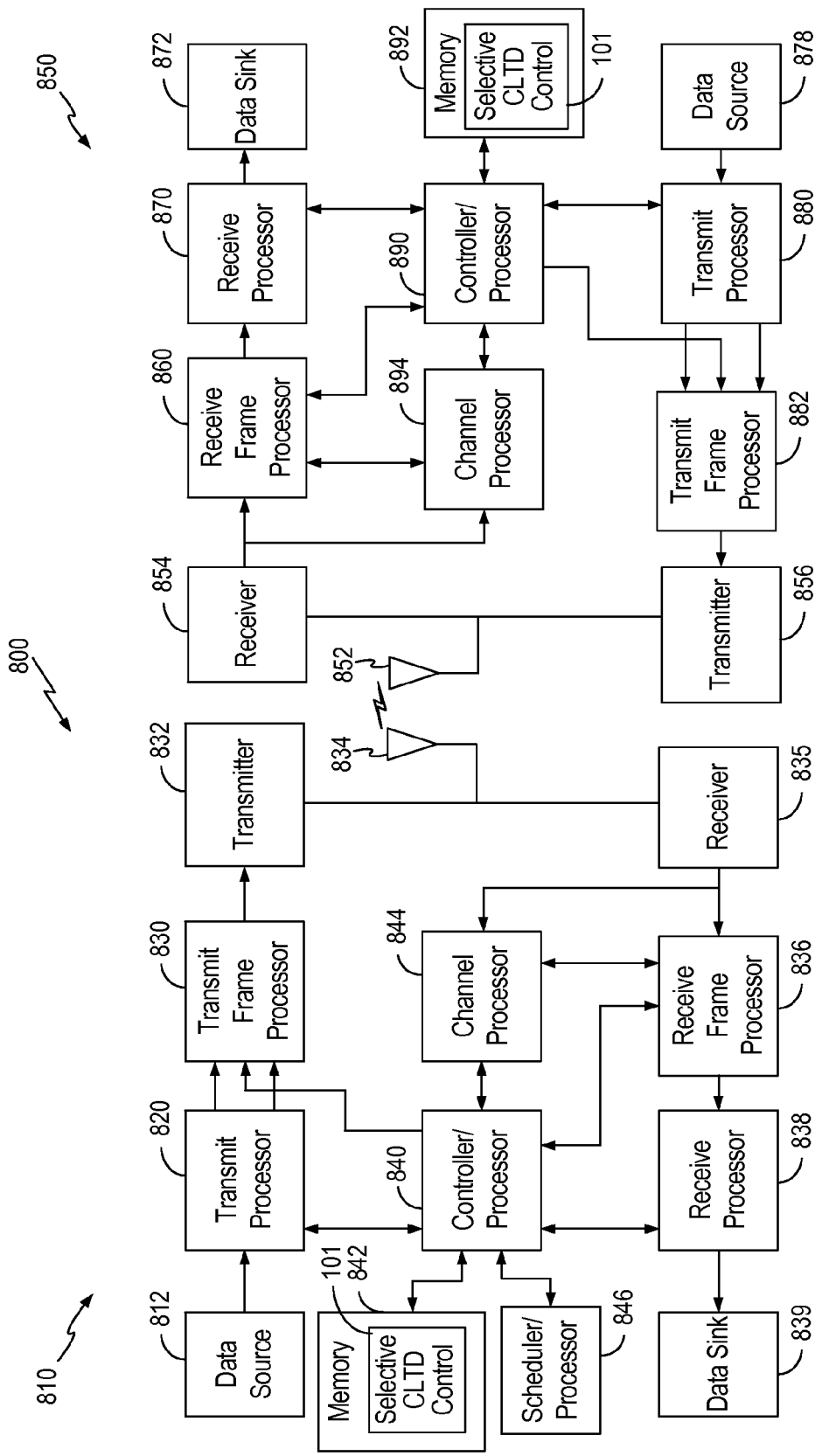
FIG. 8 is a block diagram conceptually illustrating an example of a Node B in communication with a UE in an aspect of a telecommunications system including the described aspects for controlling ULTD.

FIG. 8 is a block diagram of a Node B 810 in communication with a UE 850, where the Node B 810 may be the base node 108 in FIG. 1, and the UE 850 may be the UE 102 in FIG. 1. In the downlink communication, a transmit processor 820 may receive data from a data source 812 and control signals from a controller/processor 840. The transmit processor 820 provides various signal processing functions for the data and control signals, as well as reference signals (e.g., pilot signals). For example, the transmit processor 820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 844 may be used by a controller/processor 840 to determine the coding, modulation, spreading, and/or scrambling schemes for the transmit processor 820. These channel estimates may be derived from a reference signal transmitted by the UE 850 or from feedback from the UE 850. The symbols generated by the transmit processor 820 are provided to a transmit frame processor 830 to create a frame structure. The transmit frame processor 830 creates this frame structure by multiplexing the symbols with information from the controller/processor 840, resulting in a series of frames. The frames are then provided to a transmitter 832, which provides various signal conditioning functions including amplifying, filtering, and modulating the frames onto a carrier for downlink transmission over the wireless medium through antenna 834. The antenna 834 may include one or more antennas, for example, including beam steering bidirectional adaptive antenna arrays or other similar beam technologies.

At the UE 850, a receiver 854 receives the downlink transmission through an antenna 852 and processes the transmission to recover the information modulated onto the carrier. The information recovered by the receiver 854 is provided to a receive frame processor 860, which parses each frame, and provides information from the frames to a channel processor 894 and the data, control, and reference signals to a receive processor 870. The receive processor 870 then performs the inverse of the processing performed by the transmit processor 820 in the Node B 810. More specifically, the receive processor 870 descrambles and despreads the symbols, and then determines the most likely signal constellation points transmitted by the Node B 810 based on the modulation scheme. These soft decisions may be based on channel estimates computed by the channel processor 894. The soft decisions are then decoded and deinterleaved to recover the data, control, and reference signals. The CRC codes are then checked to determine whether the frames were successfully decoded. The data carried by the successfully decoded frames will then be provided to a data sink 872, which represents applications running in the UE 850 and/or various user interfaces (e.g., display). Control signals carried by successfully decoded frames will be provided to a controller/processor 890. When frames are unsuccessfully decoded by the receiver processor 870, the controller/processor 890 may also use an acknowledgement (ACK) and/or negative acknowledgement (NACK) protocol to support retransmission requests for those frames.

In the uplink, data from a data source 878 and control signals from the controller/processor 890 are provided to a transmit processor 880. The data source 878 may represent applications running in the UE 850 and various user interfaces (e.g., keyboard). Similar to the functionality described in connection with the downlink transmission by the Node B 810, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 894 from a reference signal transmitted by the Node B 810 or from feedback contained in the midamble transmitted by the Node B 810, may be used to select the appropriate coding, modulation, spreading, and/or scrambling schemes. The symbols produced by the transmit processor 880 will be provided to a transmit frame processor 882 to create a frame structure. The transmit frame processor 882 creates this frame structure by multiplexing the symbols with information from the controller/processor 890, resulting in a series of frames. The frames are then provided to a transmitter 856, which provides various signal conditioning functions including amplification, filtering, and modulating the frames onto a carrier for uplink transmission over the wireless medium through the antenna 852.

The uplink transmission is processed at the Node B 810 in a manner similar to that described in connection with the receiver function at the UE 850. A receiver 835 receives the uplink transmission through the antenna 834 and processes the transmission to recover the information modulated onto the carrier. The information recovered by the receiver 835 is provided to a receive frame processor 836, which parses each frame, and provides information from the frames to the channel processor 844 and the data, control, and reference signals to a receive processor 838. The receive processor 838 performs the inverse of the processing performed by the transmit processor 880 in the UE 850. The data and control signals carried by the successfully decoded frames may then be provided to a data sink 839 and the controller/processor, respectively. If some of the frames were unsuccessfully decoded by the receive processor, the controller/processor 840 may also use an acknowledgement (ACK) and/or negative acknowledgement (NACK) protocol to support retransmission requests for those frames.

The controller/processors 840 and 890 may be used to direct the operation at the Node B 810 and the UE 850, respectively. For example, the controller/processors 840 and 890 may provide various functions including timing, peripheral interfaces, voltage regulation, power management, and other control functions. The computer readable media of memories 842 and 892 may store data and software for the Node B 810 and the UE 850, respectively. A scheduler/processor 846 at the Node B 810 may be used to allocate resources to the UEs and schedule downlink and/or uplink transmissions for the UEs.

A selective CLTD controller 101, depicted as resident in memory 842 and/or memory 892, determines when to enable and to disable CLTD operation on an uplink, according with aspects disclosed herein.

Figure 9:
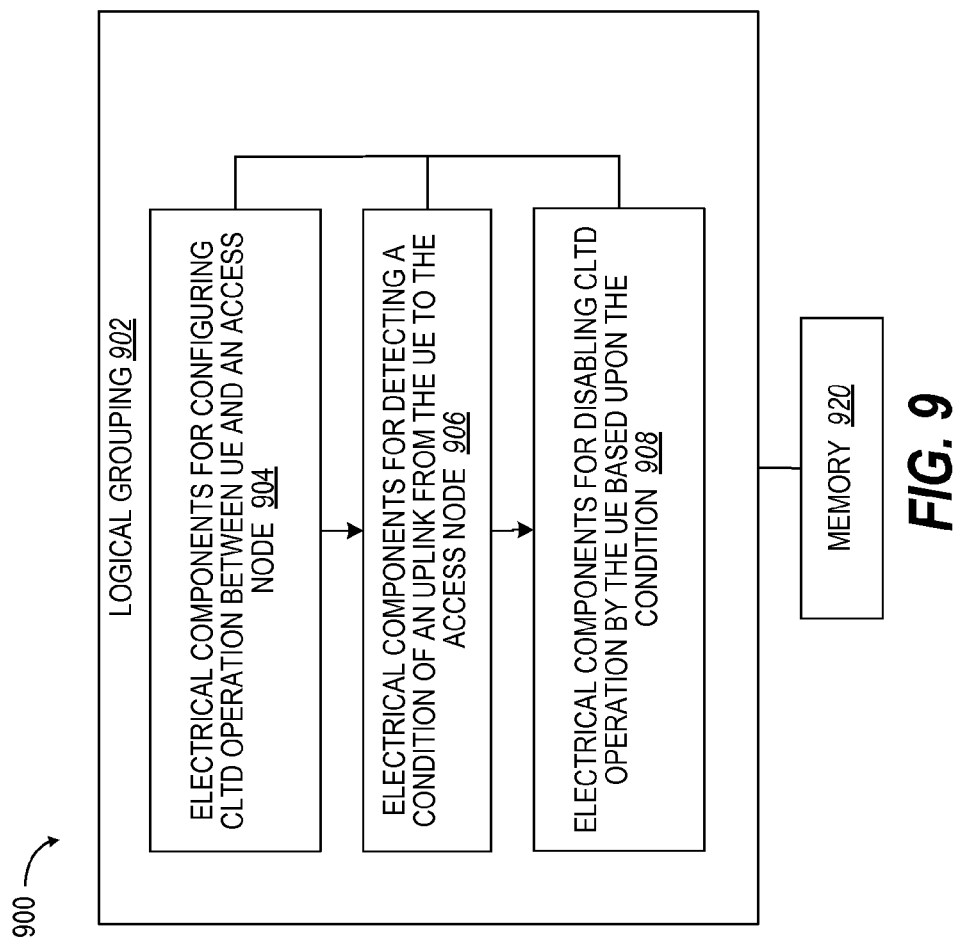
FIG. 9 is a block diagram of a system of logical groups of electrical components for wireless communication including the described aspects for controlling ULTD.

With reference to FIG. 9, illustrated is a system 900 for wireless communication. For example, system 900 can reside at least partially within one or more network entities. The system 900 can comprise a base node that is capable of Over-The-Air (OTA) communication. Aspects disclosed herein can further be distributed in a network entity for scheduling such as an RNC. It is to be appreciated that system 900 is represented as including functional blocks, which can be functional blocks that represent functions implemented by a computing platform, processor, software, or combination thereof (e.g., firmware). System 900 includes a logical grouping 902 of electrical components that can act in conjunction.

For instance, logical grouping 902 can include an electrical component 904 for configuring a closed loop transmit diversity (CLTD) operation between a User Equipment (UE) and an access node. Moreover, logical grouping 902 can include an electrical component 906 for detecting a condition of an uplink from the UE to the access node. Further, logical grouping 902 can include an electrical component 908 for disabling the CLTD operation by the UE based upon the condition. Additionally, system 900 can include a memory 920 that retains instructions for executing functions associated with electrical components 904-908. While shown as being external to memory 920, it is to be understood that one or more of electrical components 904-908 can exist within memory 920.

The closed loop transmit diversity scheme is a promising technique to improve the uplink transmission performance in HSPA. The present disclosure further provides an introduction to the motivation and theoretical analysis of a closed loop transmit diversity (CLTD) beamforming scheme for the HSPA system. Details are also provided on the algorithm description, the user equipment and Node B transmitter/receiver implementation and the corresponding system performance.

Uplink transmit diversity (ULTD) schemes employ more than one transmit antenna (usually two) at the UE to improve the uplink transmission performance, e.g., reduce the user equipment (UE) transmit power, or increase the UE coverage range, or increase the UE data rate, or the combination of the above. It can also help improve the overall system capacity. Based on the feedback requirements, ULTD schemes can be categorized into closed-loop (CL) and open-loop (OL) schemes. From the transmitter perspective, ULTD schemes can be classified as beamforming (BF) and antenna switching (AS) schemes.

In general, closed-loop (CL) transmit diversity (TD) schemes require the receiver to provide explicit feedback information about the spatial channel to assist the transmitter in choosing a transmission format over multiple transmit antennas. On the other hand, open-loop (OL) TD schemes do not. In the context of the WCDMA uplink, the term OL TD schemes includes the schemes without core standards change, i.e., without introducing new feedback channels.

There are two categories of CLTD schemes. In the CLTD beamforming scheme, the Node B feeds back to the UE a precoding (or beamforming) vector to be used over multiple transmit antennas so that the signals received at the Node B are constructively added. This in turn maximizes the receiver signal to noise ratio (SNR) and achieves the beamforming effect. In the CLTD antenna switching scheme, the Node B feeds back to the UE its choice on which transmit antenna the UE should use. This choice results in the largest channel gain between the UE transmit antenna and the Node B receive antennas. Between the two schemes, CLTD BF can achieve a better tradeoff between how fast to track the channel versus how often the scheme may disrupt the channel phase. The present innovation focuses on the CLTD BF scheme.

Several questions naturally arise about the CLTD beamforming algorithm. The first one is about CLTD benefits of beamforming to subscribers, e.g. UEs. Due to the transmit power gain from beamforming, CLTD allows subscribers to enjoy an increase in uplink data rates, or an improved uplink range. The second question is about CLTD benefits beamforming to wireless network operators. CLTD beamforming allows the operators to provide subscribers a better user experience with increased UL data rates throughout the deployment area, and cost-effective incremental infrastructure upgrade—CLTD beamforming schemes can be introduced in coverage-limited area, e.g., high-rise metro area, to extend the coverage and enhance the user experience. Furthermore, due to the reduction of interference to the other cells, there will be gain in the cell throughput as well.

Motivation of CLTD Beamforming

For a mobile user in the HSPA cellular system, the user experience is often limited by the transmit power of the UE. In the case of a cell edge user, due to transmit power limitation, it has to transmit at a low date rate, or possibly not establish a call. The technique of transmit diversity is useful to improve these situations. Assume multiple transmit antennas are utilized in the UE. The UE transmitter can apply a weighting vector to the transmit antennas such that the signals from these antennas are coherently combined at the Node B receive antennas.

Consider a simple example. In the baseline case of non-transmit diversity, both the UE and the Node B have one antenna. Assume the channel between the UE and the Node B is static:

$$H=[1] \qquad \text{Eqn. 1}$$

The receive signal to noise ratio (SNR) is $$SNR = \frac{P}{N_0} \qquad \text{Eqn. 2}$$

where P is the UE transmit power and $N_0$ is the noise power. Next, consider the case where beamforming transmit diversity is deployed at the UE. Assume the channel between the UE and the Node B is static:

$$H=[1\ e^{j\theta}] \qquad \text{Eqn. 3}$$

where θ is the phase offset between two channel links. If the UE applies the following beamforming weight vector:

$$H=[1\ e^{j\theta}]/\sqrt{2} \qquad \text{Eqn. 4}$$

To achieve the same receive SNR, the UE transmitter only needs to use transmit power P/2. This 3 dB reduction in the UE transmit power (beamforming gain) will improve the link budget and the user experience. Furthermore, when the signals across different antennas experience independent fading, coherent signal combining results in a more stable composite channel with a smaller probability of deep fading. Thus beamforming can provide diversity gain.

The motivation of considering the closed loop beamforming scheme is that, via the Node B processing and feedback, the UE transmitter can apply a beamforming phase to achieve the aforementioned gains (possibly at the expense of more complexity and more downlink feedback power).

Since the UE forms the beam only toward the serving cell, the signals from the two UE transmit antennas are typically received at all other cells without constructive addition. Thus from the network level point of view, the amount of interference caused by this UE at other Node B receivers is reduced. This interference reduction will lead to network throughput improvement. On the other hand, since in CLTD beamforming, the UE is beamforming toward the serving cell, the performance gain in the soft handover state may not be as large as the non-soft handover state.

Gain analysis of CLTD beamforming provides a theoretical analysis of the transmit power gain achievable from beamforming under various channels. For the non-transmit diversity baseline, the UE has one transmit antenna. For the beamforming transmit diversity case, the UE has two transmit antennas. On the Node B side, consider two cases: the first with one receive antenna and the second with two receive antennas. For simplicity, perfect knowledge of channel state information at the Node B receiver, ideal feedback of the beamforming weight vector to the UE, and perfect uplink power control are each assumed.

One Node B Receive Antenna: Although today's network deployments have two receive antennas at the Node B, for the sake of analysis, consider the case of one receive antenna as well, which will show more significant gain in the fading channels than the case of two receive antennas. In this case, the uplink channel for the non-transmit diversity UE is a 1×1 channel:

$$H=[h_1],\qquad\text{Eqn. 5}$$

and the uplink channel for the beamforming UE is a 2×1 channel:

$$H=[h_1\ h_2].\qquad\text{Eqn. 6}$$

The transmit power gain of beamforming depends on the channel models. The gains for additive white Gaussian noise (AWGN) channel and single path Rayleigh fading channel respectively are derived hereafter.

AWGN Channel: As described above regarding a motivation of CLTD beamforming, the beamforming UE requires half of the transmit power of the non-transmit diversity UE to achieve the same receive SNR at the Node B. Therefore, the transmit power gain in this case is 3 dB.

Single Path Rayleigh Fading Channel: For the non-transmit diversity UE, its uplink channel has a complex Gaussian distribution with zero mean and variance 0.5 per dimension (real or imaginary part). Assume the required SNR for the uplink transmission is $$SNR = \frac{P}{N_0}\qquad\text{Eqn. 7}$$

To achieve that, due to perfect power control, the instantaneous transmit power is $$\frac{P}{|h_1|^2}\qquad\text{Eqn. 8}$$

On average, the required transmit power for this baseline UE is $$E\left[\frac{P}{|h_1|^2}\right] = \int_0^\infty \frac{P}{x} e^{-x} dx = \infty\qquad\text{Eqn. 9}$$

On the other hand, for the beamforming UE, assume $h_1$ and $h_2$ and are independent and identically distributed (i.i.d.) complex Gaussian random variables with zero mean and variance 0.5 per dimension. After the UE applies the following weight vector at its transmitter:

$$\frac{1}{\sqrt{|h_1|^2+|h_2|^2}}\begin{bmatrix}|h_1|\\ |h_2|e^{j(\angle h_1 - \angle h_2)}\end{bmatrix}\qquad\text{Eqn. 10}$$

the channel power gain seen by the beamforming UE is $$|h_1|^2+|h_2|^2.\qquad\text{Eqn. 11}$$

To achieve the required $$SNR = \frac{P}{N_0}$$

for the uplink transmission, due to perfect control, the instantaneous transmit power is $$\frac{P}{|h_1|^2+|h_2|^2}\qquad\text{Eqn. 12}$$

On average, the required transmit power for the beamforming UE is $$E\left[\frac{P}{|h_1|^2+|h_2|^2}\right] = \int_0^\infty \frac{P}{x} x e^{-x} dx = P\qquad\text{Eqn. 13}$$

Therefore, the theoretical transmit power gain due to beamforming is infinity. However, in reality, since the power control is not perfect, and the maximum power limitation on the UE transmit power, the gain of beamforming is finite.

Two Receive Antennas

In this case, the uplink channel for the non-transmit diversity UE is a 1×2 channel:

$$H = \begin{bmatrix} h_{11} \\ h_{21} \end{bmatrix},\qquad\text{Eqn. 14}$$

and the uplink channel for the beamforming UE is a 2×2 channel:

$$H = \begin{bmatrix} h_{11} & h_{12} \\ h_{21} & h_{22} \end{bmatrix},\qquad\text{Eqn. 15}$$

The transmit power gain of beamforming depends on the channel models. The gains for an AWGN channel and single path Rayleigh fading channel respectively are derived hereafter.

AWGN Channel

In this case, the baseline UE sees the uplink channel $$H = \begin{bmatrix} 1 \\ e^{j\theta} \end{bmatrix},\qquad\text{Eqn. 16}$$

Assume the required SNR for the uplink transmission is $$SNR = \frac{P}{N_0}\qquad\text{Eqn. 17}$$

To achieve that, the transmit power is $$\frac{P}{2} \qquad \text{Eqn. 18}$$

On the other hand, for the beamforming UE, it sees the uplink channel $$\begin{bmatrix} 1 & e^{j\theta} \\ e^{j\psi} & e^{j\theta+\psi} \end{bmatrix} = \frac{1}{\sqrt{2}} \begin{bmatrix} 1 & 1 \\ e^{j\psi} & -e^{j\psi} \end{bmatrix} \cdot \begin{bmatrix} 2 & 0 \\ 0 & 0 \end{bmatrix} \cdot \frac{1}{\sqrt{2}} \begin{bmatrix} 1 & e^{j\theta} \\ 1 & -e^{j\theta} \end{bmatrix}. \qquad \text{Eqn. 19}$$

If the beamforming UE applies the following weight vector $$\frac{1}{\sqrt{2}} \begin{bmatrix} 1 \\ -e^{j\theta} \end{bmatrix}, \qquad \text{Eqn. 20}$$

after pilot weighted combining at the Node B receiver, the channel power gain is 4. Thus the required transmit power is $$\frac{P}{4}. \qquad \text{Eqn. 21}$$

Therefore, the transmit power gain due to beamforming is 3 dB.

Single Path Rayleigh Fading Channel

For the non-transmit diversity UE, its uplink channel is $$H = \begin{bmatrix} h_{11} \\ h_{21} \end{bmatrix}. \qquad \text{Eqn. 22}$$

Assume the two entries $h_{11}$ and $h_{21}$ are i.i.d. complex Gaussian random variables with zero mean and variance 0.5 per dimension. To achieve the required $$SNR = \frac{P}{N_0}$$

for the uplink transmission, due to perfect power control, the instantaneous transmit power is $$\frac{P}{|h_1|^2 + |h_2|^2} \qquad \text{Eqn. 23}$$

On average, the required transmit power for the non-transmit diversity UE is $$E\left[\frac{P}{|h_{11}|^2 + |h_{21}|^2}\right] = \int_0^\infty \frac{P}{x} x e^{-x} dx = P \qquad \text{Eqn. 24}$$

For the beamforming case, the uplink channel is $$H = \begin{bmatrix} h_{11} & h_{12} \\ h_{21} & h_{22} \end{bmatrix} = [u_1 \ u_2] \cdot \begin{bmatrix} s_1 & 0 \\ 0 & s_2 \end{bmatrix} \cdot [v_1 \ v_2], \qquad \text{Eqn. 25}$$

where the single value decomposition (SVD) is performed on the channel matrix.

Assume the singular values are ordered, i.e. $s_1 \geq s_2$. Then the beamforming vector applied at the UE transmitter shall be $v_1$, which has unit length. The channel power gain seen by the Node B receiver (after pilot weighted combining) is $s_1^2$, which has the following probability density function:

$$e^{-x}(x^2 - 2x + 2) - 2e^{-2x}, x \geq 0 \qquad \text{Eqn. 26}$$

To achieve the required $$SNR = \frac{P}{N_0}$$

for the uplink transmission, due to perfect power control, the instantaneous transmit power is $$\frac{P}{s_1^2} \qquad \text{Eqn. 27}$$

On average, the required transmit power for the beamforming UE is $$E\left[\frac{P}{s_1^2}\right] = \int_0^\infty \frac{P}{x} [e^{-x}(x^2 - 2x + 2) - 2e^{-2x}] dx = 0.386P \qquad \text{Eqn. 28}$$

Thus relative to the baseline, there is ideally a 4.1 dB gain through the use of beamforming.

TABLE 2

The Theoretical Transmit Power Gain for Several Channels

| | 2x1 AWGN | 2x1 Single Path Rayleigh | 2x2 AWGN | 2x2 Single Path Rayleigh |
|---|---|---|---|---|
| Tx Power Gain (dB) | 3 | ∞ | 3 | 4.1 |

Multi-path Channels: For uplink channels with multiple paths, the transmit power gain due to beamforming tends to be smaller than the single path channel. The reason is that there is no single beamforming weight vector that can be optimal for all the paths. Since it is difficult to obtain a closed form formula for the theoretical beamforming gain in the multipath channel, simulations can be relied upon to estimate the gain.

In the analysis of the theoretical transmit power gain, so far omnidirectional antennas have been assumed without correlation and imbalance. In real field applications, transmit antennas used by the UE will have antenna patterns. Again, the transmit power gain after taking into account these antenna patterns are obtained through simulation.

Figure 10:
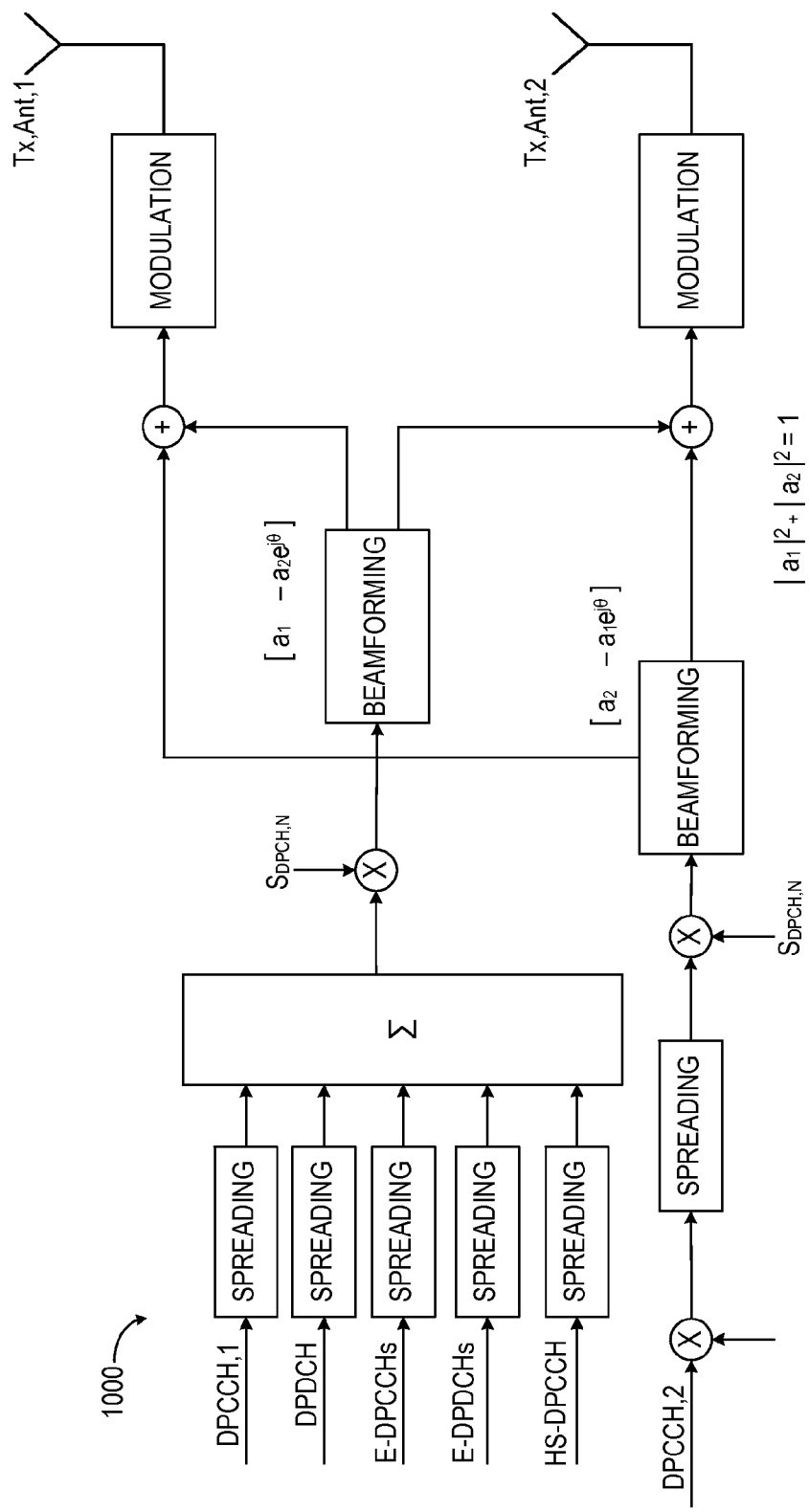
FIG. 10 is a schematic block diagram of an aspect of a CLTD beamforming UE transmitter.

In FIG. 10, a CLTD beamforming UE transmitter 1000 implements the uplink system model for the CLTD beamforming scheme:

$$y = H \cdot B \cdot d + n = H \cdot [v_1 \ v_2] \cdot \begin{bmatrix} d+c+p_1 \\ p_2 \end{bmatrix} + n \qquad \text{Eqn. 29}$$

In this scheme, the EUL data and control channels, E-DPDCHs (Enhanced Dedicated Physical Data Channel), E-DPCCH (Enhanced Dedicated Physical Control Channel), HS-DPCCH (High Speed Dedicated Physical Control Channel), Release-99 (R99) data channel DPDCH, and the primary pilot channel DPCCH,1 are always transmitted on the stronger beamforming vector v1 (or called virtual antenna), and the secondary pilot channel DPCCH,2 is transmitted on the weaker beamforming vector v2. Mathematically, the dominant virtual antenna is represented by the following beamforming vector:

$$[a_1 - a_2 e^{j\theta}] \qquad \text{Eqn. 30}$$

where $a_1^2 + a_2^2 = 1$ and the beamforming phase is denoted by $\theta$. Usually, the beamforming phase $\theta$ is quantized into a finite set, such as $\{0, 90, 180, 270\}$ degrees. Similarly, the amplitude variables $[a_1 \ a_2]$ typically belong to a finite set.

The scaled secondary pilot channel is transmitted on the weaker virtual antenna:

$$[a_2 - a_1 e^{j\theta}] \qquad \text{Eqn. 31}$$

Obviously, this beamforming weight vector is orthogonal to the stronger virtual antenna.

Node B Receiver

Since all the data and control channels are running on the same beamforming vector as the primary pilot channel, in the receiver, all the functionalities related to finger processing, such as DCH searcher, finger assignment, time tracking loop, frequency tracking loop, etc., are running on the primary pilot channel P1. The demodulation part works as if the UE is a non-transmit diversity UE, except for the additional channel estimator running on the secondary pilot channel to determine the beamforming weights. The Node B receiver estimates the composite channels from both the primary and secondary pilot, by inverting the beamforming weight matrix $$\begin{bmatrix} a_1 & a_2 \\ a_2 e^{j\psi} & -a_1 e^{j\theta} \end{bmatrix}. \qquad \text{Eqn. 32}$$

Then it estimates the physical channels $h_{r,t,k}$, r=1,2,5=1,2, k=1, . . . , L, where r is the receive antenna index, t is the transmit antenna index, and k is the finger index. After that, the Node B receiver can compute the new beamforming weight vector. A received power maximization based beamforming algorithm is used which is more general than the SVD algorithm (equivalent in single path scenario), since there may be more than one path in the uplink channel. For a given set of quantized phase $\theta$, e.g. $\{0,90,180,270\}$ degree and/or amplitude quantized value $a_1$, the received power can be computed for each phase and/or amplitude combination, given current channel estimate $\hat{H}$. Then, the phase and/or amplitude corresponding to maximum receive power is chosen as the optimal beamforming phase and/or amplitude.

$$\arg\max_{a_1, \theta} \sum_{i=1}^{L_1} [|a_1 h_{1,1,k} + \sqrt{1-a_1^2}\, e^{j\theta} h_{1,2,k}|^2] + \qquad \text{Eq. 33}$$

$$\sum_{i=1}^{L_2} [|a_1 h_{2,1,k} + \sqrt{1-a_1^2}\, e^{j\theta} h_{2,2,k}|^2]$$

Modeling of antenna patterns in system simulations are described hereafter for evaluating CLTD beamforming performance. In the CLTD beamforming performance study performed herein, realistic antenna patterns were modeled via transmit antenna correlation matrices due to both handset and laptop antenna form factors.

The 3-D antenna radiation pattern was obtained via measurements in the far field. The objective was to find the far field antenna gain at an azimuthal angle of departure $\phi_0$ which is in turn obtained based on the location of the UE with respect to the Node B.

Given a particular Angle of Departure (AoD), the components of the antenna correlation matrix $[\rho_{ij}(\phi_0)]$ at AoD $\phi_0$ is given by $$\rho_{ij}(\phi_0) \int_{\phi=0}^{2\pi} \int_{\theta=0}^{\pi} \{E_\theta^i(\theta,\phi)E_\theta^j(\theta,\phi)^* + E_\phi^i(\theta,\phi)E_\phi^j(\theta,\phi)^*\} p_{\phi_0}(\theta,\phi) \cdot \sin(\theta) \cdot d\theta d\phi \qquad \text{Eqn. 34}$$

where $E_\theta^i(\theta,\phi)$ is the vertical (V-pol) polarization component;
$E_\phi^j(\theta,\phi)$ is the horizontal (H-pol) polarization component;
i is the antenna index;
$\phi$ is the azimuth angle;
$\theta$ is the angle of elevation (inclination);
$\hat{\phi}, \hat{\theta}, \hat{r}$ are the unit vectors that form the bases; and
$p_{\phi_0}(\theta,\phi)$ is the Probability Distribution Function (PDF) to model the 3-D angle of spread.

First, via system simulation, the single UE performance is presented in terms of the transmit power gain, which is defined as the transmit power difference between a CLTD beamforming UE and a regular UE (with single antenna transmission) under identical uplink transmission conditions. The measured antenna patterns of both handset and laptop terminals are used in the simulations.

All the simulations are run with the phase only mode $$\left(a_1 = a_2 = \frac{1}{\sqrt{2}}\right),$$

and for the Item Test Unit (ITU) Pedestrian A three (3) km/h (PA3) channel, ITU Pedestrian B three (3) km/h (PB3) channel, and ITU Vehicular A thirty (30) km/h (VA30) channel.

In the simulation, a fixed payload size is used with 10 ms Enhanced Uplink (EUL) and target two (2) transmissions to measure the transmit power reduction, for which it can be expected to see similar or better performance in the case of 2 ms TTI (transmit time interval) transmission). TABLE 3 summarizes the detailed pay load size and the power settings. CLTD beamforming needs a secondary pilot transmission. The simulation uses a secondary pilot power setting of 0.35 dB which has been accounted for in the transmit power reduction computation.

TABLE 3

| Single UE fixed Payload Simulation Setup | |
| --- | --- |
| Payload Size (TBS) | 546 bits |
| E-DPDCH T2P | 6 dB |

TABLE 3-continued

Single UE fixed Payload Simulation Setup

| | |
|---|---|
| E-DPCCH C2P | −4.4 dB |
| HS-DPCCH C2P (Duty Cycle 100%) | −1.9 dB |
| Secondary Pilot C2P (Only For CLTD beamforming) | −3 dB |

TABLE 4

CLTD beamforming gain assuming a handset antenna pattern (non-soft-handover)

| Channel Type | PA3 | PB3 | VA30 |
|---|---|---|---|
| Tx Power Gain (dB) | 2.3 | 1.7 | 0.9 |

TABLE 5

CLTD beamforming gain assuming a laptop antenna pattern (non-soft-handover)

| Channel Type | PA3 | PB3 | VA30 |
|---|---|---|---|
| Tx Power Gain (dB) | 2.4 | 1.5 | 0.6 |

In TABLE 4 and TABLE 5, in the non-soft-handover state, the slow fading channels show significant transmit power gain. In the fast fading channel, the gain is smaller.

Next, the case of the beamforming UE in the soft handover state is considered. When the two links are balanced, TABLE 6 and TABLE 7 summarize the CLTD beamforming gain.

TABLE 6

CLTD beamforming gain assuming a handset antenna pattern (balanced links soft handover).

| Channel Type | PA3 | PB3 | VA30 |
|---|---|---|---|
| Tx Power Gain (dB) | 0.5 | 0.2 | 0.2 |

TABLE 7

CLTD beamforming gain assuming a laptop antenna pattern (balanced links soft-handover)

| Channel Type | PA3 | PB3 | VA30 |
|---|---|---|---|
| Tx Power Gain (dB) | 0.7 | 0.4 | 0 |

In these two cases, since the UE beamforms toward the serving cell, the non-serving cell performance may be degraded. Thus, overall, less transmit power gain can be observed than the non-soft-handover cases.

Next, the case is considered of the beamforming UE in the soft handover state with a 3 dB imbalance (the serving cell is 3 dB stronger). TABLE 8 and TABLE 9 summarize the CLTD beamforming gain. In these two cases, since the non-serving cell is 3 dB weaker, the transmit power gain is larger than the cases in TABLE 6 and TABLE 7.

TABLE 8

CLTD beamforming gain assuming a handset antenna pattern (Imbalanced links soft handover)

| Channel Type | PA3 | PB3 | VA30 |
|---|---|---|---|
| Tx Power Gain (dB) | 1.2 | 0.9 | 0.3 |

TABLE 9

CLTD beamforming gain assuming a laptop antenna pattern (Imbalanced links soft handover)

| Channel Type | PA3 | PB3 | VA30 |
|---|---|---|---|
| Tx Power Gain (dB) | 1.2 | 0.9 | 0.5 |

Finally, the case of the beamforming UE in the softer handover state with balanced links is considered. TABLE 10 and TABLE 11 summarize the CLTD beamforming gain. In these two cases, since a single Node B handles the two cells, the beamforming performance is better than the soft handover cases.

TABLE 10

CLTD Beamforming Gain assuming a handset antenna pattern (balanced links softer handover)

| Channel Type | PA3 | PB3 | VA30 |
|---|---|---|---|
| Tx Power Gain (dB) | 1.3 | 1.1 | 0.7 |

TABLE 11

CLTD Beamforming Gain assuming a laptop antenna pattern (balanced links softer handover)

| Channel Type | PA3 | PB3 | VA30 |
|---|---|---|---|
| Tx Power Gain (dB) | 1.5 | 1.1 | 0.6 |

System Performance

In this section, the CLTD beamforming performance is presented from multi-user network simulations in the ITU PA3 and PB3 channels. Throughout, a measured laptop antenna pattern was used. The cell site-to-site distance (ISD) is either 1 km or 2.8 km. A 10 ms EUL is used with target 2 transmissions, for which it can be expected to see similar or better performance in the case of 2 ms TTI transmission). Since the largest payload in 10 ms TTI is 20000, the maximum data rate each UE could achieve is around 1 Mbps.

Best Effort Traffic Model

To evaluate the Best Effort throughput performance, each cell is loaded with 10 UEs. First, in the case of 1 km cell ISD and the PA3 channel, a 19% cell throughput gain and simultaneously a 1.93 dB average transmit power gain is observed. A portion of the transmit power gain is translated into the UE and cell throughput gain. The cell edge UEs (low percentile UEs) have more percentage throughput gains than the UEs closer to the Node B.

For the case of 2.8 km cell ISD and the PA3 channel, a 17% cell throughput gain and simultaneously a 1.33 dB average transmit power gain is observed. Part of the transmit power gain is translated into the UE and cell throughput gain. The cell edge UEs (low percentile UEs) have much more percentage throughput gains than the UEs closer to the Node B.

Furthermore, compared to the case of the smaller cell size (1 km), cell edge UEs are more limited in their transmit power. Hence CLTD beamforming provides more throughput gains to those UEs.

Finally, in the case of 2.8 km cell ISD and the PB3 channel, 18% cell throughput gain and simultaneously 0.89 dB average transmit power gain is observed. Similar to the PA3 channel case, the cell edge UEs (low percentile UEs) have much more percentage throughput gains than the UEs closer to the Node B.

As seen in the Best Effort traffic simulation, for larger ISD, CLTD beamforming could significantly improve the UE throughput at the cell edge. To further demonstrate this benefit, the CLTD beamforming performance is evaluated under a bursty traffic model. An open loop burst traffic model is used where a burst of 1M bits arrives at the UE queue every 5 seconds regardless of the UE queue status. Effectively, the offered load at each UE is 200 kbps. The new performance metric look at is the UE burst rate which is defined as the burst size (1 M bits) divided by the time from the first bit of the burst arrived at the UE queue to the time the last bit of the burst was successfully received at the UE. This definition of the burst rate includes the queuing delay.

In order to better understand the simulation data, it should be emphasized that, as the offered load to the UE is 200 kbps, it is critical for the UE to sustain a physical layer throughput greater than 200 kbps in order to maintain a stable queue.

In the following, the results are presented in terms of the UE average burst rate CDF, the percentile-wise UE average burst rate gain as well as the average UE Tx power reduction.

The results for the case of 1 km cell ISD, PA3 channel and a loading of two (2) UEs per cell are demonstrated. Even for the case when transmit diversity is disabled, due to the small site-to-site distance and small loading of two (2) UEs per cell, all UEs could sustain a throughput higher than 200 kbps. CLTD beamforming does not offer much improvement in terms of the burst rate. The reason is that, in this case, no UE in the system is power limited. The burst rate cannot reach the maximum UE throughput of 1 Mbps primarily due to the queuing delay when both UEs have bursts that arrive at the same time and they compete at the Node B for scheduling opportunities. However, to achieve the same burst rate, the CLTD beamforming is capable of a 3.35 dB reduction in average UE transmit power. This transmit power reduction is larger than the single UE fixed payload test as shown in the previous section (2.4 dB) which reveals the additional benefit of CLTD beamforming in terms of reducing the interference to the other cells. In the multi-UE scenario, each UE could further reduce its transmit power since it needs to combat less interference at the Node B receiver, which cannot be seen in the single UE simulation.

In the next step, the loading is increased from 2 UEs/Cell to 8 UEs/Cell. As the loading increases, the UEs cannot sustain 200 kbps transmission. In this case, CLTD beamforming significantly improves the UE burst rate especially for the UEs at the cell edge. In addition to the burst rate improvement, CLTD beamforming also helps to reduce the UE average transmit power by 2.69 dB.

To further demonstrate the cell coverage improvement, 2.8 km ISD is simulated.

Even with two (2) UEs per cell loading, due to the large site-to-site distance, some UEs in the cell edge cannot support 200 kbps transmission. CLTD beamforming improves the cell edge UE burst rate by up to 200%. In addition, while achieving higher UE burst rates, CLTD beamforming also helps reduce the UE average transmit power by 2.12 dB.

The bursty traffic model is also evaluated for different levels of loading for the PB3 channel, and similar benefit is observed from CLTD beamforming in terms of improving the UE burst rate, as well as reducing the average UE transmit power.

By benefit of the foregoing, the potential transmit power gains achievable by the CLTD beamforming scheme on the uplink in HSPA have been confirmed. The transmit power gain not only extends the cell coverage, but can also be translated into user throughput gain. Furthermore, in the multi-cell scenario, the CLTD beamforming scheme can further improve the cell throughput. With realistic antenna patterns, the CLTD beamforming scheme shows a UE transmit power reduction of more than 2 dB for the ITU "PedA" 3 km/h channel, more than 1 dB gain for ITU "PedB" 3 km/h channel, and more than 0.6 dB gain for ITU "VehA" 30 km/h channel in the non-soft handover state, and some gains in the soft handover state (depending on the uplink imbalance).

From the system performance point of view, the benefits of CLTD beamforming have three primary areas: (i) Improved cell coverage or UE performance in the cell edge when UE becomes transmit power limited; (ii) Reduced interference to other cells and, in return, increases the average UE as well as the cell throughput; and (iii) Reduced UE transmit power.

When a cell is mostly serving slow speed channels, for full buffer type of traffic, around 18% cell throughput gain is observed, while simultaneously reducing the average UE transmit power by 1-2 dB. For the UEs that are transmit power limited or in the cell edge, the UE experiences a significant improvement (over 150%) in throughput. For a bursty traffic source, with CLTD beamforming, more UEs will be able to enjoy the high date rate transmission. CLTD beamforming can significantly increase the UE burst rate at the cell edge as well as reduce the UE transmit power by up to 3 dB.

Several aspects of a telecommunications system have been presented with reference to a W-CDMA system. As those skilled in the art will readily appreciate, various aspects described throughout this disclosure may be extended to other telecommunication systems, network architectures and communication standards.

For example, the techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Additionally, some aspects or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Further, as used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Also, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for wireless communication, comprising:
configuring a closed loop transmit diversity (CLTD) operation between a User Equipment (UE) and an access node;
detecting a condition of an uplink from the UE to the access node; and
disabling the CLTD operation by the UE based upon the condition,
wherein detecting the condition of the uplink further comprises determining that a transmit power for transmitting a downlink signaling order for the CLTD operation exceeds a threshold.

2. The method of claim 1, wherein disabling CLTD operation by the UE further comprises transmitting a downlink signaling order via High Speed Shared Control CHannel (HS-SCCH).

3. The method of claim 1, wherein detecting the condition of the uplink further comprises detecting a velocity of the UE as being above a threshold.

4. The method of claim 1, wherein transmitting the downlink signaling order further comprises transmitting beamforming feedback weight information.

5. The method of claim 1, wherein detecting the condition of the uplink further comprises determining a residual packet error rate at the access node as being above a threshold.

6. The method of claim 1, further comprising:
detecting that the condition of the uplink has ended; and
enabling CLTD operation by the UE in response to detecting the condition has ended.

7. The method of claim 1, wherein the condition is detected at the UE.

8. The method of claim 1, wherein the condition is detected at the access node.

9. The method of claim 1, wherein the configuring and the disabling the CLTD operation further comprises scheduling the UE by a radio network controller.

10. The method of claim 1, wherein the configuring of the CLTD operation further comprises configuring the UE to transmit one or more of a Dedicated Physical Control Channel (DPCCH), a Dedicated Physical Data Channel (DPDCH), High Speed Dedicated Physical Control Channel (HS-DPCCH), an Enhanced Dedicated Physical Control Channel (E-DPCCH), or an Enhanced Dedicated Physical Data Channel (E-DPDCH) on a primary precoding vector via a first physical antenna, and to transmit a Secondary Dedicated Physical Control Channel (S-DPCCH) on a secondary precoding vector via a second physical antenna.

11. The method of claim 1, wherein the disabling of the CLTD operation further comprises:
determining a difference greater than a first threshold between a first physical antenna and a second physical antenna in signal-to-noise ratio over a measuring interval; and
selecting to transmit in non-CLTD operation on one of the first physical antenna and the second physical antenna based upon the determining of the difference.

12. The method of claim 1, wherein the disabling of the CLTD operation further comprises configuring the UE to transmit one or more of a Dedicated Physical Control Channel (DPCCH), a Dedicated Physical Data Channel (DPDCH), a High Speed Dedicated Physical Control Channel (HS-DPCCH), an Enhanced Dedicated Physical Control Channel (E-DPCCH), or an Enhanced Dedicated Physical Data Channel (E-DPDCH) on a selected one of a first physical antenna or a second physical antenna, and to transmit a Secondary Dedicated Physical Control Channel (S-DPCCH) on another one of the first physical antenna and the second physical antenna, the method further comprising:
detecting that the condition of the uplink has ended by measuring the S-DPCCH; and
enabling the CLTD operation by the UE in response to detecting the condition has ended.

13. The method of claim 1, wherein the disabling of the CLTD operation further comprises:
determining a first power amplification capability for transmitting on a first physical antenna and a second power amplification capability for transmitting on a second physical antenna; and
selecting one of the first physical antenna or second physical antenna to transmit one or more of a Dedicated Physical Control Channel (DPCCH), a Dedicated Physical Data Channel (DPDCH), a High Speed Dedicated Physical Control Channel (HS-DPCCH), an Enhanced Dedicated Physical Control Channel (E-DPCCH), or an Enhanced Dedicated Physical Data Channel (E-DPDCH) based upon the determining of the first and second power amplification capability.

14. At least one processor for wireless communication, comprising:
a first module for configuring a closed loop transmit diversity (CLTD) operation between a User Equipment (UE) and an access node;
a second module for detecting a condition of an uplink from the UE to the access node; and
a third module for disabling the CLTD operation by the UE based upon the condition,
wherein the second module is further for determining that a transmit power for transmitting a downlink signaling order for the CLTD operation exceeds a threshold.

15. A computer program product for wireless communication, comprising:
a non-transitory computer-readable storage medium for storing sets of code comprising:
a first set of code for causing a computer to configure a closed loop transmit diversity (CLTD) operation between a User Equipment (UE) and an access node;
a second set of code for causing the computer to detect a condition of an uplink from the UE to the access node; and
a third set of code for causing the computer to disable the CLTD operation by the UE based upon the condition,
wherein the second set of code further comprises code for causing the computer to determine that a transmit power for transmitting a downlink signaling order for the CLTD operation exceeds a threshold.

16. An apparatus for wireless communication, comprising:
means for configuring a closed loop transmit diversity (CLTD) operation between a User Equipment (UE) and an access node;
means for detecting a condition of an uplink from the UE to the access node; and
means for disabling the CLTD operation by the UE based upon the condition,
wherein the means for detecting the condition of the uplink further comprises means for determining that a transmit power for transmitting a downlink signaling order for the CLTD operation exceeds a threshold.

17. An apparatus for wireless communication, comprising:
a scheduler for configuring a closed loop transmit diversity (CLTD) operation between a User Equipment (UE) and an access node;
a receiver for detecting a condition of an uplink from the UE to the access node; and
a transmitter for disabling the CLTD operation by the UE based upon the condition,
wherein the receiver is further for determining that a transmit power for transmitting a downlink signaling order for the CLTD operation exceeds a threshold.

18. The apparatus of claim 17, wherein the transmitter is further for disabling the CLTD operation by the UE by transmitting a downlink signaling order via High Speed Shared Control CHannel (HS-SCCH).

19. The apparatus of claim 17, wherein the receiver is further for detecting the condition of the uplink by detecting a velocity of the UE as being above a threshold.

20. The apparatus of claim 17, wherein the transmitter is further for transmitting the downlink signaling order by transmitting beamforming feedback weight information.

21. The apparatus of claim 17, wherein the receiver is further for detecting the condition of the uplink by determining a residual packet error rate at the access node as being above a threshold.

22. The apparatus of claim 17, wherein the receiver is further for detecting that the condition of the uplink has ended; and
wherein the transmitter is further for enabling CLTD operation by the UE in response to detecting the condition has ended.

23. The apparatus of claim 17, wherein the receiver is located at the UE for detecting the condition at the UE.

24. The apparatus of claim 17, wherein the receiver is located at the access node for detecting the condition at the access node.

25. The apparatus of claim 17, wherein the scheduler comprises a radio network controller for scheduling the configuring and the disabling the CLTD operation between UE and the access node.

26. The apparatus of claim 17, wherein the scheduler configures the UE to transmit one or more of a Dedicated Physical Control Channel (DPCCH), a Dedicated Physical Data Channel (DPDCH), a High Speed Dedicated Physical Control Channel (HS-DPCCH), an Enhanced Dedicated Physical Control Channel (E-DPCCH), or an Enhanced Dedicated Physical Data Channel (E-DPDCH) on a primary precoding vector via a first physical antenna, and to transmit a Secondary Dedicated Physical Control Channel (S-DPCCH) on a secondary precoding vector via a second physical antenna.

27. The apparatus of claim 17, wherein the scheduler is further for disabling the CLTD operation by:
determining a difference greater than a first threshold between a first physical antenna and a second physical antenna in signal-to-noise ratio over a measuring interval; and
selecting to transmit in a non-CLTD operation on one of the first physical antenna or the second physical antenna based upon the determining of the difference.

28. The apparatus of claim 17, wherein the scheduler is further for disabling the CLTD operation by configuring the UE to transmit one or more of a Dedicated Physical Control Channel (DPCCH), a Dedicated Physical Data Channel (DPDCH), a High Speed Dedicated Physical Control Channel (HS-DPCCH), an Enhanced Dedicated Physical Control Channel (E-DPCCH), or an Enhanced Dedicated Physical Data Channel (E-DPDCH) on a selected one of a first physical antenna or a second physical antenna, and to transmit a Secondary Dedicated Physical Control Channel (S-DPCCH) on another one of the first physical antenna or the second physical antenna, wherein the scheduler is further for detecting that the condition of the uplink from the UE to the access node has ended based on a measuring of the S-DPCCH, and for enabling the CLTD operation by the UE in response to detecting the condition has ended.

29. The apparatus of claim 17, wherein the scheduler is further for disabling the CLTD operation by:
determining a first power amplification capability for transmitting on a first physical antenna and a second power amplification capability for transmitting on a second physical antenna; and
selecting one of the first physical antenna or the second physical antenna to transmit one or more of a Dedicated Physical Control Channel (DPCCH), a Dedicated Physical Data Channel (DPDCH), a High Speed Dedicated Physical Control Channel (HS-DPCCH), an Enhanced Dedicated Physical Control Channel (E-DPCCH), or an Enhanced Dedicated Physical Data Channel (E-DPDCH) based upon the determining of the first and second power amplification capability.

* * * * *